United States Patent
Kazuno et al.

(10) Patent No.: US 9,240,603 B2
(45) Date of Patent: Jan. 19, 2016

(54) METHOD OF CONTROLLING FUEL CELL SYSTEM

(75) Inventors: Shuichi Kazuno, Utsunomiya (JP); Hibiki Saeki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 13/462,405

(22) Filed: May 2, 2012

(65) Prior Publication Data

US 2012/0288778 A1 Nov. 15, 2012

(30) Foreign Application Priority Data

May 12, 2011 (JP) .................................. 2011-106774

(51) Int. Cl.
*H01M 8/04* (2006.01)
*B60L 11/18* (2006.01)

(52) U.S. Cl.
CPC ....... *H01M 8/04753* (2013.01); *B60L 11/1887* (2013.01); *B60L 11/1888* (2013.01); *H01M 8/04559* (2013.01); *B60L 2210/14* (2013.01); *H01M 8/04179* (2013.01); *H01M 8/04231* (2013.01); *H01M 8/04268* (2013.01); *Y02E 60/50* (2013.01); *Y02T 10/7225* (2013.01); *Y02T 90/34* (2013.01)

(58) Field of Classification Search
None
See application file for complete search history.

(56) References Cited

U.S. PATENT DOCUMENTS

| 8,088,527 | B2 | 1/2012 | Manabe et al. | |
|---|---|---|---|---|
| 8,361,666 | B2 | 1/2013 | Hibino et al. | |
| 2005/0233192 | A1 | 10/2005 | Ishikawa et al. | |
| 2005/0260466 | A1* | 11/2005 | Kobayashi et al. | 429/13 |
| 2006/0234094 | A1 | 10/2006 | Sakai | |
| 2006/0275644 | A1* | 12/2006 | Krause et al. | 429/38 |
| 2009/0130509 | A1 | 5/2009 | Manabe et al. | |
| 2009/0148736 | A1 | 6/2009 | Manabe et al. | |
| 2010/0047630 | A1 | 2/2010 | Imanishi et al. | |
| 2010/0055521 | A1 | 3/2010 | Umayahara et al. | |
| 2010/0068576 | A1* | 3/2010 | Hamada et al. | 429/23 |
| 2010/0266916 | A1 | 10/2010 | Imanishi et al. | |
| 2010/0291452 | A1* | 11/2010 | Imanishi et al. | 429/432 |

FOREIGN PATENT DOCUMENTS

CN 101569044 A 10/2009
DE 11 2006 003 141 T5 10/2008
(Continued)

OTHER PUBLICATIONS

Japanese Office Action dated Jul. 23, 2013, issued in Japanese Patent Application No. 2011-106774, w/English partial translation.
(Continued)

*Primary Examiner* — Carlos Barcena
*Assistant Examiner* — Wojciech Haske
(74) *Attorney, Agent, or Firm* — Westerman, Hattori, Daniels & Adrian, LLP

(57) ABSTRACT

In a case where gas supply controller of an FC system determines that the temperature of an FC is a predetermined temperature or less, the gas supply controller fixes the FC voltage to a voltage value within a voltage region where degradation is relatively small, the voltage value being below a voltage range where an oxidation-reduction proceeds. Further, the amount of a gas supplied to the FC is changed in accordance with electric power required by a load.

3 Claims, 27 Drawing Sheets

(56) References Cited

FOREIGN PATENT DOCUMENTS

| | | |
|---|---|---|
| DE | 11 2006 003 289 T5 | 10/2008 |
| JP | 2004-296338 A | 10/2004 |
| JP | 2007-5038 A | 1/2007 |
| JP | 2007-149511 A | 6/2007 |
| JP | 2007-184196 A | 7/2007 |
| JP | 2008-226591 A | 9/2008 |
| JP | 2009-089536 A | 4/2009 |
| JP | 2009-158398 A | 7/2009 |
| WO | 2004/055929 A1 | 7/2004 |
| WO | WO 2008146928 A1 * | 12/2008 |
| WO | WO 2009028637 A1 * | 3/2009 |

OTHER PUBLICATIONS

Japanese Office Action dated Apr. 16, 2013, issued in corresponding Japanese Patent Application No. 2011-106774, w/ partial English translation.
German Office Action dated Oct. 30, 2012, issued in corresponding Germany Patent Application No. 10 2012 207 789.8, with English translation (13 pages).
German Search Report dated Oct. 30, 2012, issued in corresponding Germany Patent Application No. 10 2012 207 789.8, with English translation (10 pages).
Chinese Office Action dated Mar. 4, 2014, issued in corresponding Chinese Patent Application No. 201210138792.X with English translation (9 pages).

* cited by examiner

ENERGY MANAGEMENT (S3)

METHOD OF CONTROLLING FUEL CELL SYSTEM

CROSS-REFERENCE TO RELATED APPLICATION

This application is based upon and claims the benefit of priority from Japanese Patent Application No. 2011-106774 filed on May 12, 2011, of which the contents are incorporated herein by reference.

BACKGROUND OF THE INVENTION

1. Field of the Invention

The present invention relates to a method of controlling a fuel cell system including a fuel cell and a load driven by electric power outputted from the fuel cell.

2. Description of the Related Art

Conventionally, techniques of warming up a fuel cell utilized in a fuel cell vehicle or the like has been proposed (U.S. Patent Application Publication No. 2010/0047630 (hereinafter referred to as "US 2010/0047630 A1"). In US 2010/0047630 A1, the output voltage of the fuel cell (FC) is set to be equal to or larger than the minimum drive voltage of a load power source (see "Abstract" therein). More specifically, it is determined whether warm-up is necessary or not based on the temperature of the FC (S2 of FIG. 4 therein). If warm-up is necessary (S2: YES), it is confirmed whether or not there is any demand for the motor output (S3). If there is no demand for the motor output (S3: NO), a first low-efficiency operation is performed (S4 of FIG. 3). In the first low-efficiency operation, the output voltage of the FC is relatively low. If there is any demand for the motor output (S3: YES), a second low-efficiency operation is performed (S5 of FIG. 3). In the second low-efficiency operation, the output voltage of the FC is relatively high.

The first low-efficiency operation is used in the case where there is no demand for output from a traction motor (M3), and the second low-efficiency operation is used in the case where there is the output demand from the traction motor (paragraph [0044] therein). In the first low-efficiency operation, the output voltage of the FC is set to be less than the minimum drive voltage (Vlim) of the traction motor (paragraph [0045] therein). In the second low-efficiency operation, the FC current is calculated depending on the FC demand output, and the air stoichiometric ratio is changed depending on the calculated FC current. At this time, the FC output voltage is fixed at the minimum drive voltage (FIG. 5, paragraph [0046] therein).

SUMMARY OF THE INVENTION

As described above, though US 2010/0047630 A1 is aimed to achieve quick warm-up of the FC, no consideration is given to techniques of suppressing degradation of the FC.

The present invention has been made taking the problem of this type into account, and an object of the present invention is to provide a method of controlling a fuel cell system, which makes it possible to suppress degradation of a fuel cell, facilitate effective warm-up of the fuel cell, and suppress excessive generation of electric power and shortage of generated electric power in the fuel cell.

A method of controlling a fuel cell system according to the present invention is provided, the fuel cell including a fuel cell having catalyst, for performing power generation by inducing reaction of oxygen or hydrogen at the catalyst, a gas supply unit for supplying at least one of the oxygen and the hydrogen to the fuel cell, a voltage controller for controlling power generation voltage of the fuel cell, a load driven by electric power outputted from the fuel cell, and a gas supply controller for controlling the voltage controller to fix an actual voltage of the fuel cell to a predetermined voltage outside a voltage range where an oxidation-reduction of the catalyst proceeds, and, in a state where the actual voltage is thus fixed, controlling the gas supply unit such that concentration of at least one of the oxygen and the hydrogen is adjusted in accordance with electric power required by the load. In the method, if the gas supply controller determines that the temperature of the fuel cell is a predetermined temperature or less, the gas supply controller fixes the voltage of the fuel cell to a voltage value within a voltage region where degradation is relatively small, the voltage region being below the voltage range where the oxidation-reduction proceeds, and changes an amount of gas supplied to the fuel cell in accordance with the electric power required by the load.

In the present invention, since the actual voltage of the fuel cell is fixed to the predetermined voltage outside the voltage range where the oxidation-reduction proceeds, oxidation reaction and reduction reaction of the catalyst are prevented from occurring repeatedly frequently in the same period, and thus degradation of the fuel cell can be prevented. In particular, since the actual voltage of the fuel cell is fixed to the voltage value within a voltage region where degradation of the fuel cell is relatively small, it is possible to further reduce degradation of the fuel cell. Additionally, since at least one of oxygen concentration and hydrogen concentration is controlled in accordance with the electric power required by the load, and the fuel cell outputs the electric power required by the load, it is possible to suppress excessive generation of electric power and shortage of generated electric power in the fuel cell.

In the method, in the case where the stability in power generation of the fuel cell is impaired, the voltage of the fuel cell may be increased within a voltage range below the voltage range where the oxidation-reduction proceeds. Thus, in the case where the stability in power generation of the fuel cell is impaired, by increasing the power generation voltage of the fuel cell, it is possible to reduce the power generation current. Since the stoichiometric ratio of at least one of oxygen and hydrogen is increased, it becomes possible to maintain the stability in power generation desirably.

In the method, the fuel cell system supplies electric power to a motor, and at the time of performing warming up operation on the fuel cell in a case where the predetermined voltage is set to a minimum motor drive voltage or less; until it becomes possible to perform normal operation of the fuel cell, the warming up operation may be performed while the power generation voltage being fixed to the predetermined voltage; and when it becomes possible to perform normal operation of the fuel cell, the warming up operation may be performed with the power generation voltage being adjusted to a value which is the minimum motor drive voltage or more and below the voltage range where the oxidation-reduction proceeds. In this manner, both of rapid warm-up and operation of the fuel cell system can be achieved.

The fuel cell system can be mounted, e.g., in a vehicle. Thus, high durability of the vehicle and high start-up performance of the vehicle can be achieved suitably.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

1. Description Regarding Overall Structure

[1-1. Overall Structure]

Figure 1:
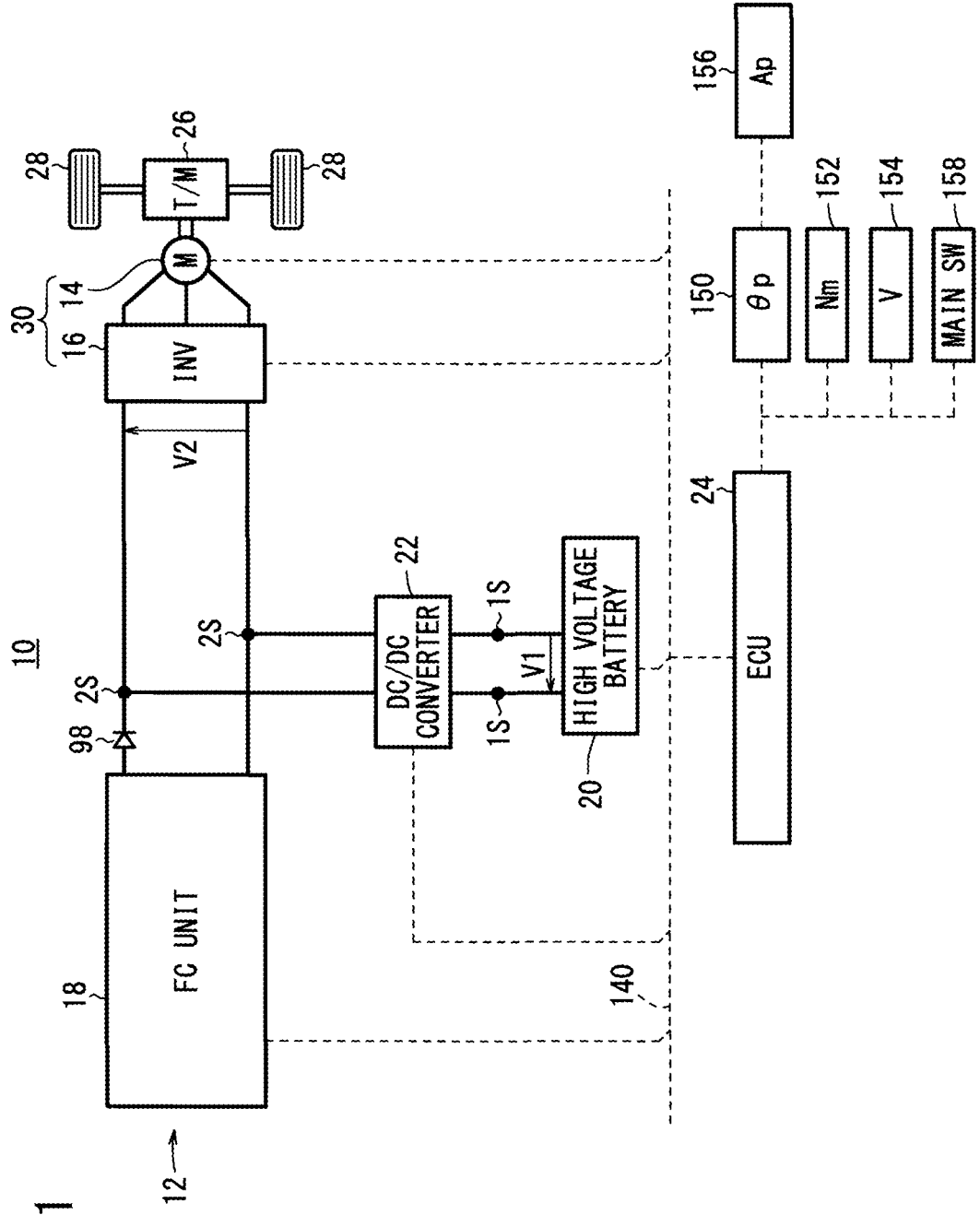
FIG. 1 is a diagram schematically showing an overall structure of a fuel cell vehicle equipped with a fuel cell system according to an embodiment of the present invention.
Figure 2:
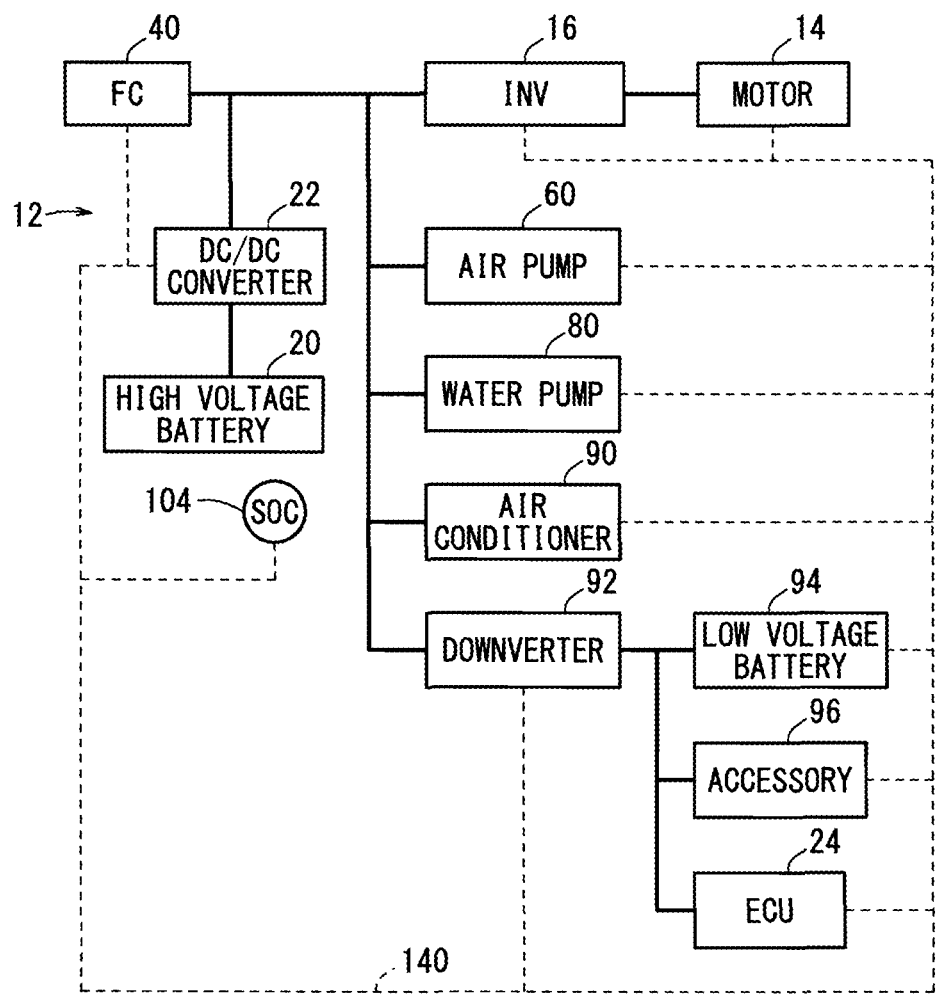
FIG. 2 is a block diagram showing a power system of the fuel cell vehicle.

FIG. 1 is a diagram schematically showing the overall structure of a fuel cell vehicle 10 (hereinafter referred to as the "FC vehicle 10") equipped with a fuel cell system 12 (hereinafter referred to as the "FC system 12") according to an embodiment of the present invention. FIG. 2 is a block diagram showing a power system of the FC vehicle 10. As shown in FIGS. 1 and 2, the FC vehicle 10 includes a traction motor 14 and an inverter (auxiliary device) 16 in addition to the FC system 12.

The FC system 12 includes a fuel cell unit 18 (hereinafter referred to as the "FC unit 18"), a high voltage battery (hereinafter referred to as the "battery 20") (energy storage device), a DC/DC converter (voltage control means, voltage controller) 22, and an electronic control unit (gas supply control means, gas supply controller) 24 (hereinafter referred to as the "ECU 24").

[1-2. Drive System]

The motor 14 generates a driving force based on the electric power supplied from the FC unit 18 and the battery 20, and rotates wheels 28 using the driving force through a transmission 26. Further, the motor 14 outputs electric power generated by regeneration (regenerative electric power Preg) [W] to the battery 20 or the like (see FIG. 2).

The inverter 16 has three phase full bridge structure, and carries out DC/AC conversion to convert direct current into alternating current in three phases. The inverter 16 supplies the alternating current to the motor 14, and supplies the direct current after AC/DC conversion as a result of regeneration to the battery 20 or the like through a DC/DC converter 22.

It should be noted that the motor 14 and the inverter 16 are collectively referred to as a load 30. The load 30 may include components (auxiliary device) such as an air pump (reactant gas supply apparatus) 60, a water pump 80, and an air conditioner 90 as described later.

[1-3. FC System]

(1-3-1. Overall Structure)

Figure 3:
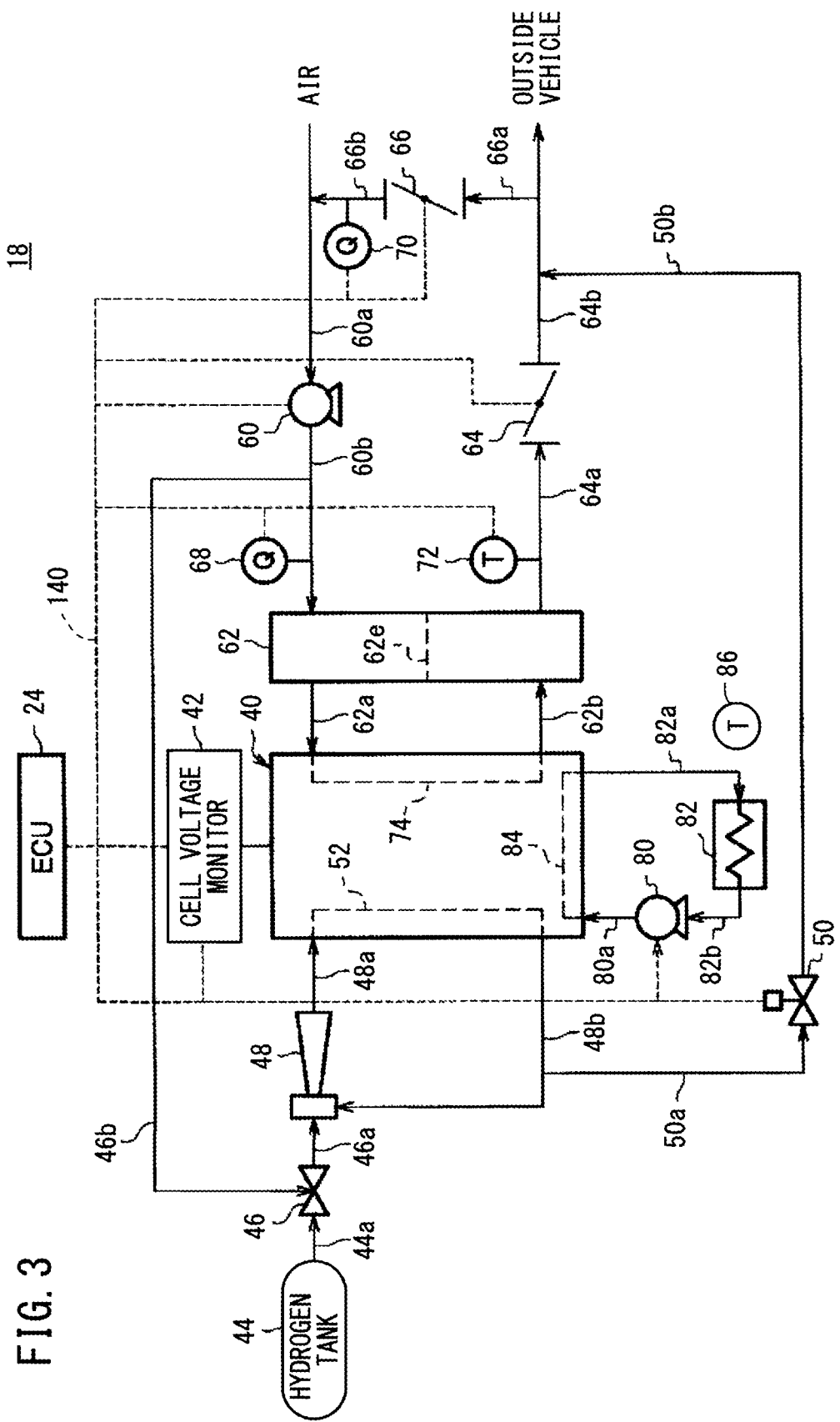
FIG. 3 is a diagram schematically showing a structure of a fuel cell unit according to the embodiment.

FIG. 3 is a diagram schematically showing a structure of the FC unit 18. The FC unit 18 includes a fuel cell stack 40 (hereinafter referred to as the "FC stack 40" or the "FC 40"), an anode system for supplying hydrogen (fuel gas) to, and discharging the hydrogen (fuel gas) from anodes of the FC stack 40, a cathode system for supplying the air (oxygen-containing gas) to, and discharging the air (oxygen-containing gas) from cathodes of the FC stack 40, a coolant system for circulating coolant water (coolant) to cool the FC stack 40, and a cell voltage monitor 42.

(1-3-2. FC Stack 40)

For example, the FC stack 40 is formed by stacking fuel cells (hereinafter referred to as the "FC cells") each including an anode, a cathode, and a solid polymer electrolyte membrane interposed between the anode and the cathode.

(1-3-3. Anode System)

The anode system includes a hydrogen tank 44 (gas supply means, gas supply unit), a regulator 46, an ejector 48, and a normally-closed purge valve 50. The hydrogen tank 44 contains hydrogen as the fuel gas. The hydrogen tank 44 is connected to the inlet of an anode channel 52 through a pipe 44a, a regulator 46, a pipe 46a, an ejector 48, and a pipe 48a. Thus, the hydrogen in the hydrogen tank 44 can be supplied to the anode channel 52 through the pipe 44a or the like. A shut-off valve (not shown) is provided in the pipe 44a. At the time of power generation of the FC stack 40, the shut-off valve is opened by the ECU 24.

The regulator 46 regulates the pressure of the supplied hydrogen to a predetermined value, and discharges the hydrogen. That is, the regulator 46 regulates the pressure on the downstream side (pressure of the hydrogen on the anode side) in response to the pressure (pilot pressure) of the air on the cathode side supplied through a pipe 46b. Therefore, the pressure of the hydrogen on the anode side is linked to the pressure of the air on the cathode side. As described later, by changing the rotation number or the like of the air pump 60 so as to change the oxygen concentration, the pressure of the hydrogen on the anode side changes as well.

The ejector 48 generates a negative pressure by ejecting hydrogen from the hydrogen tank 44 through a nozzle. By this negative pressure, the anode off gas can be sucked from a pipe 48b.

The outlet of the anode channel 52 is connected to a suction port of the ejector 48 through the pipe 48b. The anode off gas discharged from the anode channel 52 flows through the pipe 48b and again into the ejector 48 to allow circulation of the anode off gas (hydrogen).

The anode off gas contains hydrogen that has not been consumed in the electrode reaction at the anodes, and water vapor. Further, a gas-liquid separator (not shown) is provided at the pipe 48b for separating/recovering water components (condensed water (liquid) and water vapor (gas)) in the anode off gas.

Part of the pipe 48b is connected to a dilution device (not shown) provided in a pipe 64b as described later, through a pipe 50a, a purge valve 50, and a pipe 50b. When it is determined that power generation of the FC stack 40 is not performed stably, the purge valve 50 is opened for a predetermined period in accordance with an instruction from the ECU 24. In the dilution device, the hydrogen in the anode off gas from the purge valve 50 is diluted by the cathode off gas.

(1-3-4. Cathode System)

The cathode system includes the air pump 60, a humidifier 62, a normally-opened back pressure valve (reactant gas supply apparatus) 64, a normally-opened circulation valve (gas supply means, gas supply unit) 66, flow rate sensors 68, 70, and a temperature sensor 72.

The air pump 60 compresses the external air (air), and supplies the compressed air to the cathode. A suction port of the air pump 60 is connected to the outside (outside of the vehicle) through a pipe 60a, and an ejection port of the air pump 60 is connected to the inlet of a cathode channel 74 through a pipe 60b, the humidifier 62, and a pipe 62a. When the air pump 60 is operated in accordance with an instruction from the ECU 24, the air pump 60 sucks the air outside the vehicle through the pipe 60a, compresses the sucked air, and supplies the compressed air to the cathode channel 74 through the pipe 60b or the like under pressure.

The humidifier 62 has a plurality of hollow fiber membranes 62e having water permeability. The humidifier 62 humidifies the air flowing toward the cathode channel 74 through the hollow fiber membranes 62e by exchanging water components between the air flowing toward the cathode channel 74 and the highly humidified cathode off gas discharged from the cathode channel 74.

A pipe 62b, the humidifier 62, a pipe 64a, the back pressure valve 64, and the pipe 64b are provided at the outlet of the cathode channel 74. The cathode off gas (oxygen-containing off gas) discharged from the cathode channel 74 is discharged to the outside of the vehicle through the pipe 62b or the like. The dilution device (not shown) is provided at the pipe 64b.

For example, the back pressure valve 64 is a butterfly valve, and the opening degree of the back pressure valve 64 is controlled by the ECU 24 to regulate the pressure of the air in the cathode channel 74. More specifically, if the opening degree of the back pressure valve 64 becomes small, the pressure of the air in the cathode channel 74 is increased, and oxygen concentration per volume flow rate (volume concentration) becomes high. Conversely, if the opening degree of the back pressure valve 64 becomes large, the pressure of the air in the cathode channel 74 is decreased, and oxygen concentration per volume flow rate (volume concentration) becomes low.

The pipe 64b at a downstream side of the dilution device is connected to the pipe 60a through a pipe 66a, the circulation valve 66, and a pipe 66b. Thus, some of the exhaust gas (cathode off gas) is supplied as a circulating gas to the pipe 60a through the pipe 66a, the circulation valve 66, and the pipe 66b. The circulating gas is mixed with the fresh air from the outside of the vehicle, and sucked into the air pump 60.

For example, the circulation valve 66 is a butterfly valve, and the opening degree of the circulation valve 66 is controlled by the ECU 24 to regulate the flow rate of the circulating gas.

A flow rate sensor 68 is connected to the pipe 60b. The flow rate sensor 68 detects the flow rate [g/s] of the air flowing toward the cathode channel 74, and outputs the detected flow rate to the ECU 24. A flow rate sensor 70 is connected to the pipe 66b. The flow rate sensor 70 detects the flow rate QC [g/s] of the circulating gas flowing toward the pipe 60a, and outputs the detected flow rate to the ECU 24.

A temperature sensor 72 is connected to the pipe 64a. The temperature sensor 72 detects the temperature of the cathode off gas, and the temperature sensor 72 outputs the detected temperature to the ECU 24. Since the temperature of the circulating gas is substantially equal to the temperature of the cathode off gas, the temperature of the circulating gas can be detected based on the temperature of the cathode off gas detected by the temperature sensor 72.

(1-3-5. Cooling System)

The cooling system includes a water pump 80, a radiator (heat radiator) 82, and a temperature sensor 86. The water pump 80 circulates the coolant water (coolant), and an ejection port of the water pump 80 is connected to a suction port of the water pump 80 through a pipe 80a, a coolant channel 84, a pipe 82a, the radiator 82 and a pipe 82b in the order listed. When the water pump 80 is operated in accordance with an instruction from the ECU 24, the coolant water is circulated between the coolant channel 84 and the radiator 82 to cool the FC stack 40. The temperature sensor 86 detects the temperature Tw [° C.] of the coolant water and outputs the detected result to the ECU 24.

(1-3-6. Cell Voltage Monitor)

The cell voltage monitor 42 is a device for detecting the cell voltage Vcell of each of unit cells of the FC stack 40. The cell voltage monitor 42 includes a monitor body, and a wire harness connecting the monitor body with each of the unit cells. The monitor body scans all of the unit cells at predetermined intervals to detect the cell voltage Vcell of each cell, and calculates the average cell voltage and the lowest cell voltage. Then, the monitor body outputs the average cell voltage and the lowest cell voltage to the ECU 24.

(1-3-7. Power System)

As shown in FIG. 2, electric power from the FC 40 (hereinafter referred to as the "FC electric power Pfc") is supplied to the air pump 60, the water pump 80, an air conditioner 90, a downverter 92, a low voltage battery 94, an accessory 96, and the ECU 24 in addition to the inverter 16 and the motor 14

(during power running), the DC/DC converter 22, and the high voltage battery 20 (during charging). As shown in FIG. 1, a back flow prevention diode 98 is disposed between the FC unit 18 (FC 40) and the inverter 16 and the DC/DC converter 22. Further, the power generation voltage of the FC 40 (hereinafter referred to as the "FC voltage Vfc") is detected by a voltage sensor 100 (FIG. 4), and the power generation current of the FC 40 (hereinafter referred to as the FC current Ifc") is detected by a current sensor 102. The FC voltage Vfc and the FC current Ifc are outputted to the ECU 24.

[1-4. High Voltage Battery 20]

The battery 20 is an energy storage device (energy storage) containing a plurality of battery cells. For example, a lithium-ion secondary battery, a nickel hydrogen secondary battery, or a capacitor can be used as the battery 20. In the embodiment, the lithium-ion secondary battery is used. The output voltage [V] of the battery 20 (hereinafter referred to as the "battery voltage Vbat") is detected by an unillustrated voltage sensor, and the output current [A] of the battery 20 (hereinafter referred to as the "battery current Ibat") is detected by an illustrated current sensor. The battery voltage Vbat and the battery current Ibat are outputted to the ECU 24. The remaining battery level (state of charge) (hereinafter referred to as the "SOC") [%] of the battery 20 is detected by a SOC sensor 104 (FIG. 2), and outputted to the ECU 24.

[1-5. DC/DC Converter 22]

The DC/DC converter 22 controls targets to which the FC electric power Pfc from the FC unit 18, the electric power [W] supplied from the battery 20 (hereinafter referred to as the "battery electric power Pbat"), and the regenerative electric power Preg from the motor 14 are supplied.

Figure 4:
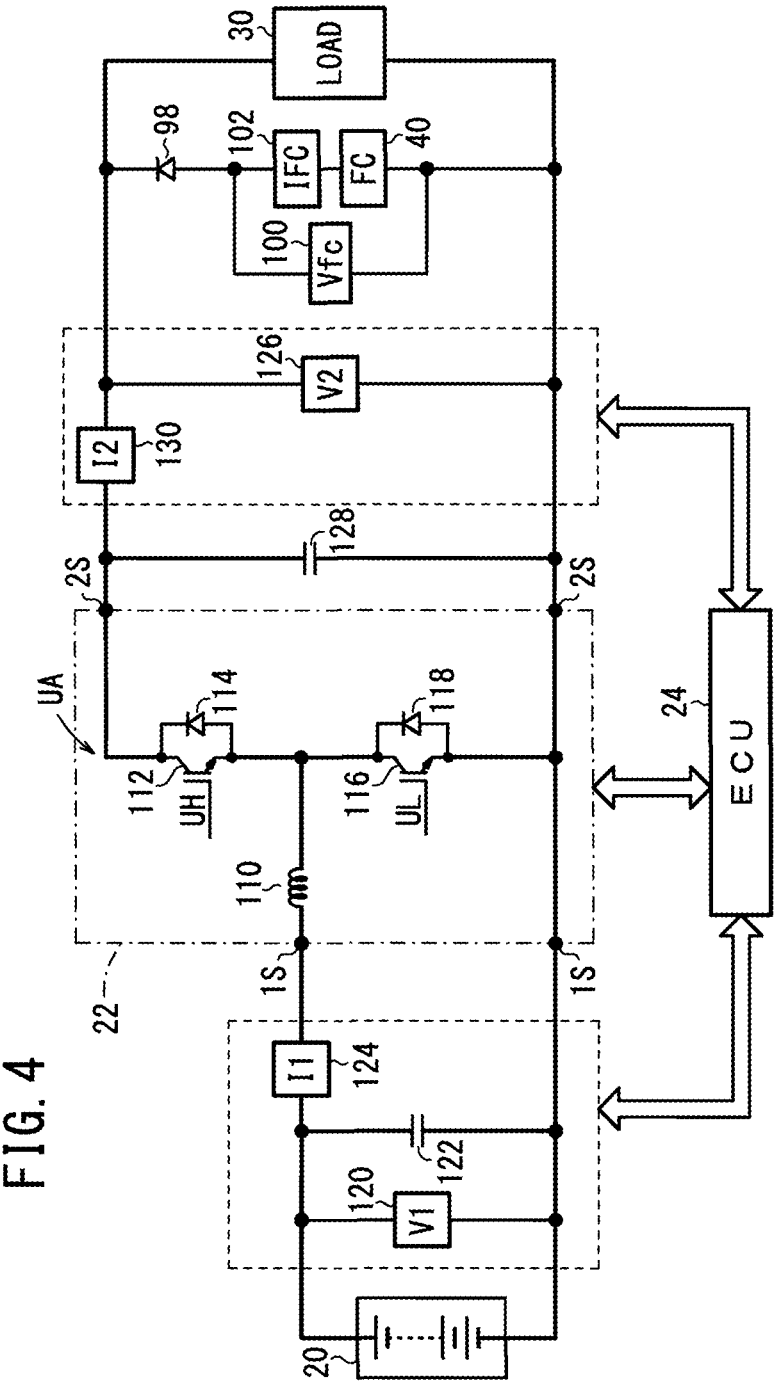
FIG. 4 is a diagram showing details of a DC/DC converter according to the embodiment.

FIG. 4 shows details of the DC/DC converter 22 in the present embodiment. As shown in FIG. 4, one side of the DC/DC converter 22 is connected to the primary side 1S where the battery 20 is provided, and the other side of the DC/DC converter 22 is connected to the secondary side 2S, which is connection points between the load 30 and the FC 40.

The DC/DC converter 22 is a chopper type step up/down voltage converter for increasing the voltage on the primary side 1S (primary voltage V1) [V] to the voltage on the secondary side 2S (secondary voltage V2) [V] (V1≤V2), and decreasing the secondary voltage V2 to the primary voltage V1.

As shown in FIG. 4, the DC/DC converter 22 includes a phase arm UA interposed between the primary side 1S and the secondary side 2S, and a reactor 110.

The phase arm UA includes an upper arm element (an upper switching element 112 and a diode 114) and a lower arm element (a lower arm switching element 116 and a diode 118). For example, MOSFET, IGBT, or the like is adopted in each of the upper arm switching element 112 and the lower arm switching element 116.

The reactor 110 is interposed between the middle point (common connection point) of the phase arm UA and the positive electrode of the battery 20. The reactor 110 is operated to release and accumulate energy during voltage conversion between the primary voltage V1 and the secondary voltage V2 by the DC/DC converter 22.

The upper arm switching element 112 is turned on when high level of a gate drive signal (drive voltage) UH is outputted from the ECU 24, and the lower arm switching element 116 is turned on when high level of a gate drive signal (drive voltage) UL is outputted from the ECU 24.

The ECU 24 detects primary voltage V1 by a voltage sensor 120 provided in parallel with a smoothing capacitor 122 on the primary side, and detects electrical current on the primary side (primary current I1) [A] by a current sensor 124. Further, the ECU 24 detects secondary voltage V2 by a voltage sensor 126 provided in parallel with the smoothing capacitor 128 on the secondary side, and detects electrical current on the secondary side (secondary current I2) [A] by a current sensor 130.

[1-6. ECU 24]

The ECU 24 controls the motor 14, the inverter 16, the FC unit 18, the battery 20, and the DC/DC converter 22 through a communication line 140 (see e.g., FIG. 1). For implementing the control, programs stored in a memory (ROM) are executed, and detection values obtained by various sensors such as the cell voltage monitor 42, the flow rate sensors 68, 70, the temperature sensor 72, 86, the voltage sensors 100, 120, 126, the current sensors 102, 124, 130, and the SOC sensor 104 are used.

In addition to the above sensors, the various sensors herein include an opening degree sensor 150, a motor rotation number sensor 152, and a vehicle velocity sensor 154 (FIG. 1). The opening degree sensor 150 detects the opening degree θp [degrees] of an accelerator pedal 156, and the rotation number sensor 152 detects the rotation number Nm [rpm] of the motor 14. The vehicle velocity sensor 154 detects the vehicle velocity V [km/h] of the FC vehicle 10. Further, a main switch 158 (hereinafter referred to as the "main SW 158") is connected to the ECU 24. The main SW 158 switches between supply and non-supply of the electric power from the FC unit 18 and the battery 20 to the motor 14. This main SW 158 can be operated by a user.

The ECU 24 includes a microcomputer. Further, as necessary, the ECU 24 has a timer and input/output (I/O) interfaces such as an A/D converter and a D/A converter. The ECU 24 may comprise only a single ECU. Alternatively, the ECU 24 may comprise a plurality of ECUs for each of the motor 14, the FC unit 18, the battery 20, and the DC/DC converter 22.

After the load required by the FC system 12, i.e., required by the FC vehicle 10 as a whole is determined based on the state of the FC stack 40, the state of the battery 20, and the state of the motor 14, and also based on inputs (load requests) from various switches and various sensors, the ECU 24 determines allocation (shares) of loads through adjustment, and more specifically determines a good balance among a load which should be assigned to the FC stack 40, a load which should be assigned to the battery 20, and a load which should be assigned to the regenerative power supply (motor 14), and sends instructions to the motor 14, the inverter 16, the FC unit 18, the battery 20, and the DC/DC converter 22.

2. Control According to the Present Embodiment

Next, control in the ECU 24 will be described.

[2-1. Basic Control]

Figure 5:
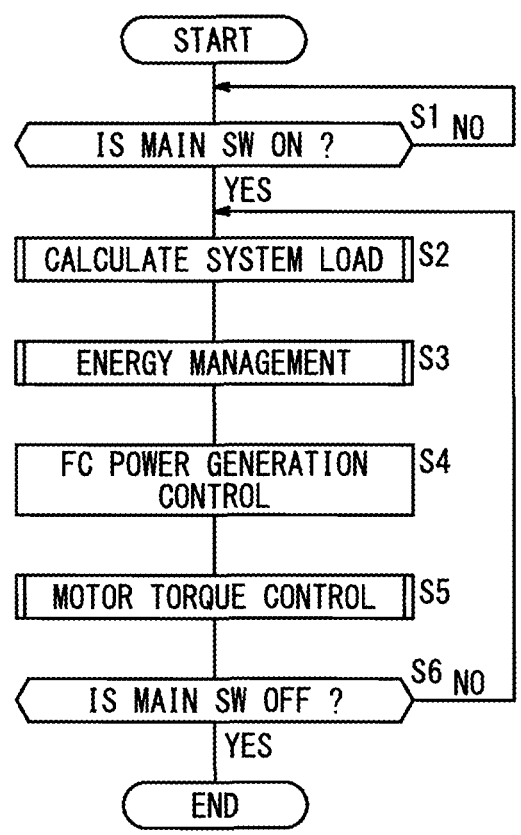
FIG. 5 is a flow chart showing basic control in an electronic control unit (ECU)

FIG. 5 is a flow chart showing basic control in the ECU 24. In step S1, the ECU 24 determines whether or not the main SW 158 is in an ON state. If the main SW 158 is not in the ON state (S1: NO), step S1 is repeated. If the main SW 158 is in the ON state (S1: YES), the control proceeds to step S2. In step S2, the ECU 24 calculates the load (system load Psys) [W] required by the FC system 12.

In step S3, the ECU 24 performs energy management of the FC system 12. The energy management herein is intended to suppress degradation of the FC stack 40, and improve the efficiency in the output of the entire FC system 12.

In step S4, the ECU 24 implements control for peripheral devices of the FC stack 40, i.e., the air pump 60, the back pressure valve 64, the circulation valve 66, and the water pump 80 (FC power generation control). In step S5, the ECU 24 implements torque control of the motor 14.

In step S6, the ECU 24 determines whether or not the main SW 158 is in an OFF state. If the main SW 158 is not in the OFF state (S6: NO), the control returns to step S2. If the main SW 158 is in the ON state (S6: YES), the current process is finished.

[2-2. Calculation of System Load Psys]

Figure 6:
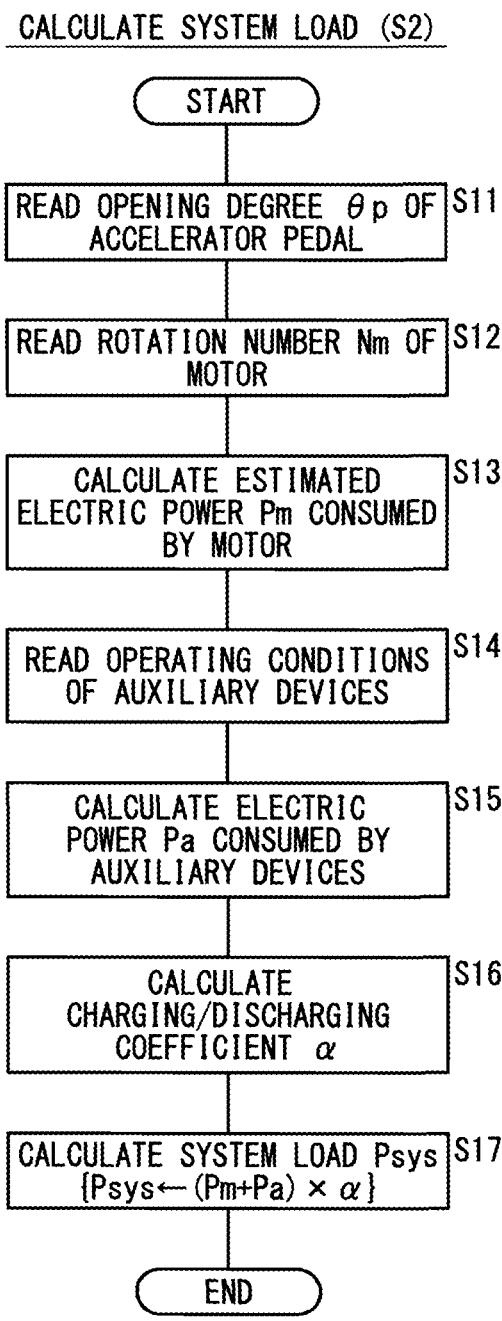
FIG. 6 is a flow chart of calculating a system load.

FIG. 6 is a flow chart for calculating the system load Psys. In step S11, the ECU 24 reads the opening degree θp of the accelerator pedal 156 from the opening degree sensor 150. In step S12, the ECU 24 reads the rotation number Nm [rpm] of the motor 14 from the rotation number sensor 152.

Figure 7:
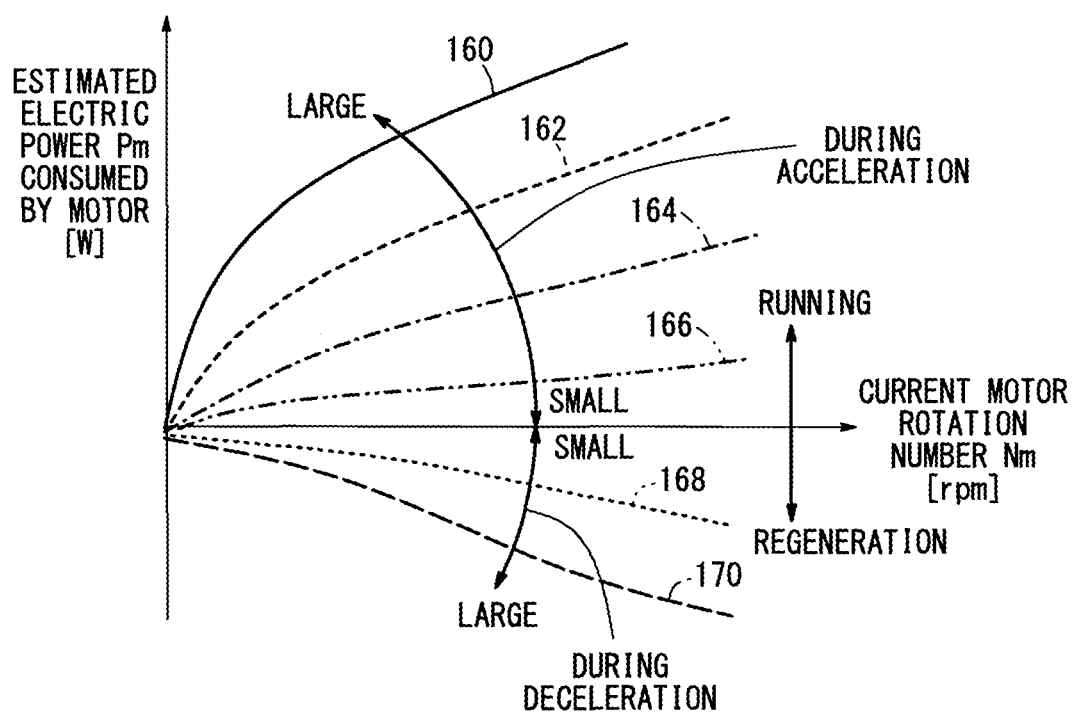
FIG. 7 is a graph showing the relationship between the current rotation number of a motor and the estimated electric power consumed by the motor.

In step S13, the ECU 24 calculates the estimated electric power Pm [W] consumed by the motor 14 based on the opening degree θp and the rotation number Nm. Specifically, in a map shown in FIG. 7, the relationship between the rotation number Nm and the estimated consumed energy Pm is stored for each opening degree θp. For example, in the case where the opening degree θp is θp1, a characteristic 160 is used. Likewise, in the cases where the opening degrees θp are θp2, θp3, θp4, θp5, and θp6, characteristics 162, 164, 166, 168, and 170 are used, respectively. After the characteristic indicating the relationship between the rotation number Nm and the consumed electric power Pm is determined based on the opening degree θp, based on the determined characteristic, the estimated consumed energy Pm in correspondence with the rotation number Nm is determined.

In step S14, the ECU 24 reads data of the current operating conditions from auxiliary devices. For example, the auxiliary devices herein include auxiliary devices operated at high voltage, such as the air pump 60, the water pump 80, and the air conditioner 90, and auxiliary devices operated at low voltage, such as the low voltage battery 94, the accessory 96, and the ECU 24. For example, as for the operating condition of the air pump 60, the rotation number of the air pump 60 (hereinafter referred as the "air pump rotation number Nap" or the "rotation number Nap") [rpm] is read. As for the operating condition of the water pump 80, the rotation number of the water pump 80 (hereinafter referred to as the "water pump rotation number Nwp" or the "rotation number Nwp") [rpm] is read. As for the operating condition of the air conditioner 90, output settings of the air conditioner 90 are read.

In step S15, the ECU 24 calculates the electric power Pa [W] consumed by the auxiliary devices depending on the present operating conditions of the auxiliary devices. In step S16, the ECU 24 calculates charging/discharging coefficient α. The charging/discharging coefficient α is a coefficient by which the sum (provisional system load) of the estimated electric power Pm consumed by the motor 14 and electric power Pa consumed by the auxiliary devices is multiplied. The charging/discharging coefficient α is determined depending on the SOC of the battery 20 and an average value of the regenerative electric power Preg of the motor 14 (hereinafter referred to as the "average regenerative electric power Pregave"). The average regenerative electric power Pregave is an average value of the regenerative electric power Preg obtained within a predetermined period.

Figure 8:
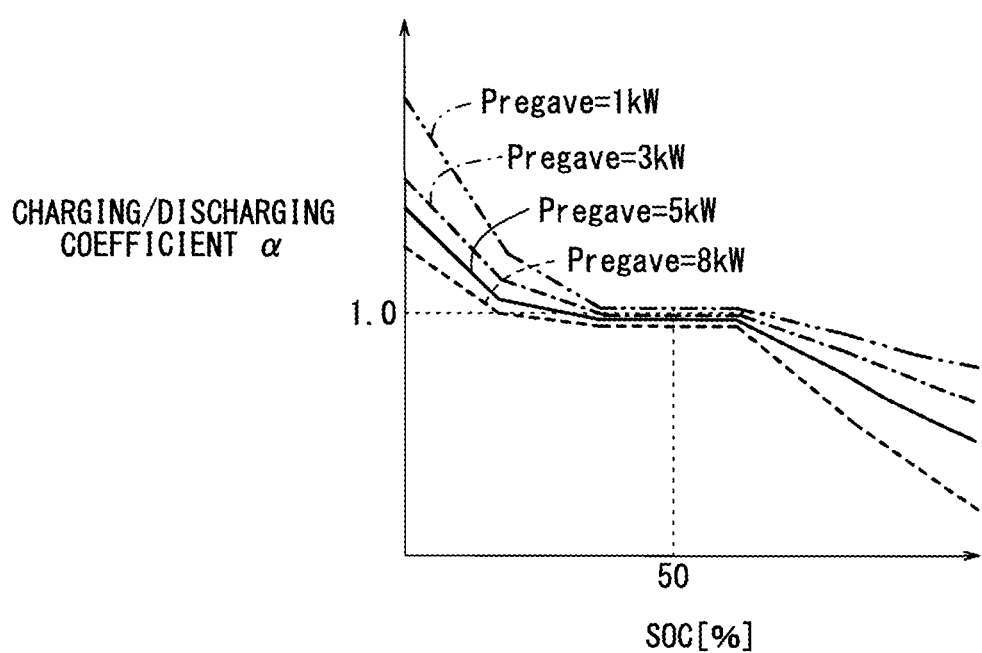
FIG. 8 is a graph showing the relationship among the SOC of a battery, the charging/discharging coefficient, and the average regenerative electric power.

FIG. 8 is map showing the relationship among the SOC, the charging/discharging coefficient α, and the average regenerative electric power Pregave. In an example of FIG. 8, the target SOC is 50%. When the SOC exceeds 50%, (when the battery 20 is in a sufficiently charged state), the charging/discharging coefficient α is set to be less than 1. Thus, by multiplying the provisional system load by a multiplier factor less than 1, the system load Psys is made small, and then it becomes possible to consume the excessive electric power of the battery 20. Further, when the SOC is less than 50% (when charging is required), the charging/discharging coefficient α is set to be greater than 1. Thus, by multiplying the provisional system load by a multiplier factor greater than 1, the system load Psys is made large, and then it becomes possible to compensate for the shortage of SOC.

Further, in the example of FIG. 8, the relationship between the SOC and the charging/discharging coefficient α is switched depending on the average regenerative electric power Pregave. That is, as shown in FIG. 8, if the average regenerative electric power Pregave is low (i.e., in an environment where it is difficult to obtain the regenerative electric power Preg), since it is likely that the regenerative electric power Preg is not sufficient, in a range where the SOC exceeds 50%, the charging/discharging coefficient α is increased, and in a range where the SOC is less than 50%, the charging/discharging coefficient α is changed to a value which is close to 1. If the average regenerative electric power Pregave is high (i.e., in an environment where it is easy to obtain the regenerative electric power Preg), since it is likely that the larger regenerative electric power Preg is available, in a range where the SOC exceeds 50%, the charging/discharging coefficient α is decreased, and in a range where the SOC is less than 50%, the charging/discharging coefficient α is changed to a value which is largely remote from 1. The target SOC may be set to a value other than 50%. Further, measured values or simulated values can be used in the map of FIG. 8.

Referring back to FIG. 6, in step S17, the ECU 24 multiplies the sum (provisional system load) of the estimated electric power Pm consumed by the motor 14 and the electric power Pa consumed by the auxiliary devices by the charging/discharging coefficient α to calculate the estimated consumed electric power in the entire FC vehicle (i.e., system load Psys).

[2-3. Energy Management]

As described above, the energy management in the present embodiment is aimed to improve the efficiency in the output of the entire FC system 12, while suppressing degradation of the FC stack 40.

(2-3-1. Premise)

Figure 9:
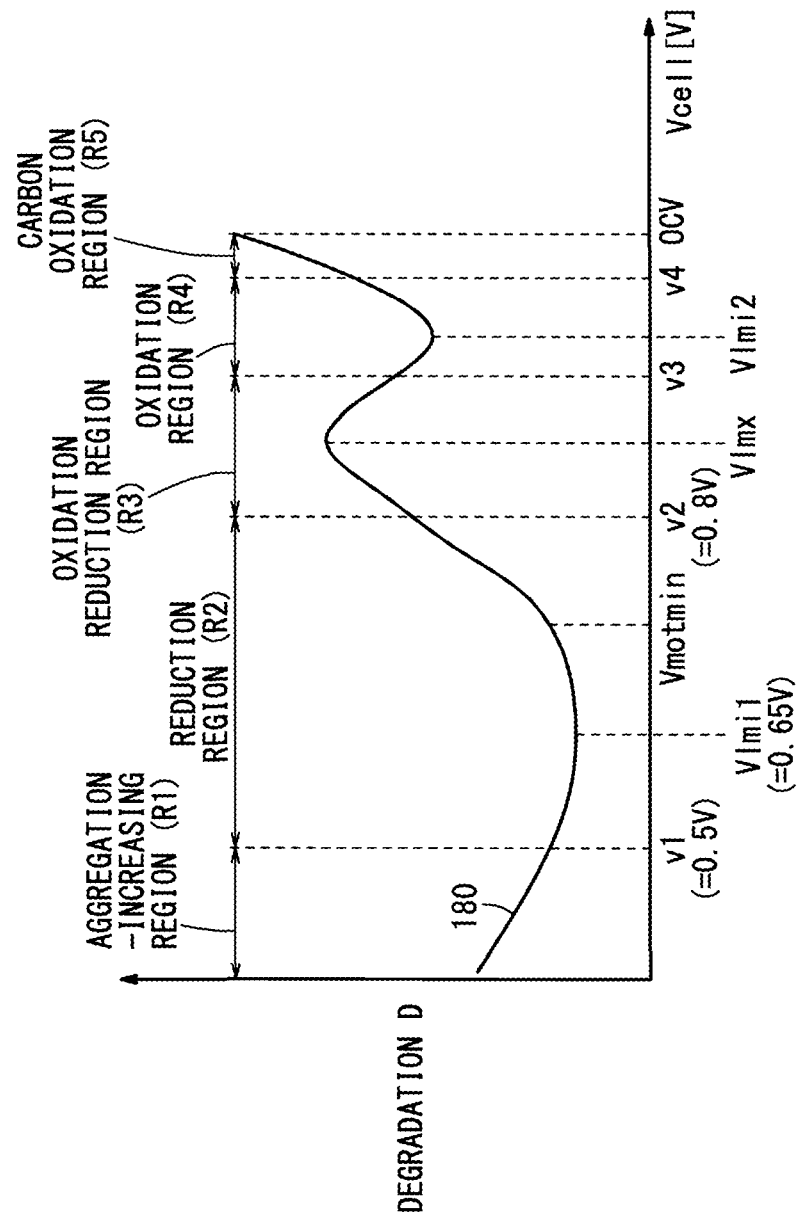
FIG. 9 is a graph showing an example of the relationship between the electric potential of a fuel cell of a fuel cell stack and degradation of the fuel cell.

FIG. 9 shows an example of the relationship between the voltage of the FC cell of the FC stack 40 (cell voltage Vcell) [V] and the degradation D of the cell. That is, a curve 180 in FIG. 9 shows the relationship between the cell voltage Vcell and the degradation D.

In FIG. 9, in a region below the electric potential v1 (e.g., 0.5V), reduction reaction of platinum (oxidized platinum) in the FC cell proceeds heavily, and aggregation of platinum occurs excessively (hereinafter referred to as the "platinum-aggregation increasing region R1" or the "aggregation increasing region R1"). In a region from the electric potential v1 to the electric potential v2 (e.g., 0.8V), reduction reaction proceeds stably (hereinafter referred to as the "platinum reduction region R2" or the "reduction region R2").

In a region from the electric potential v2 to the electric potential v3 (e.g. 0.9V), oxidation-reduction reaction of platinum proceeds (hereinafter referred to as the "platinum oxidation reduction progress region R3" or the "oxidation reduction region R3"). In a region from the electric potential v3 to the electric potential v4 (e.g., 0.95V), oxidation reaction of platinum proceeds stably (hereinafter referred to as the stable platinum oxidation region R4" or the "oxidation region R4"). In a region from the electric potential v4 to OCV (open circuit voltage), oxidation of carbon in the cell proceeds (hereinafter referred to as the "carbon oxidation region R5").

As described above, in FIG. 9, if the cell voltage Vcell is in the platinum reduction region R2 or the stable platinum oxidation region R4, degradation of the FC cell occurs to a smaller extent in comparison with the adjacent regions. In contrast, if the cell voltage Vcell is in the platinum-aggregation increasing region R1, the platinum oxidation reduction progress region R3, or the carbon oxidation region R5, degradation of the FC cell occurs to a greater extent in comparison with the adjacent regions.

In FIG. 9, on the face of it, a curve 180 is uniquely determined. However, in practice, the curve 180 varies depending on variation of the cell voltage Vcell (varying speed Acell) [V/sec] per unit time.

Figure 10:
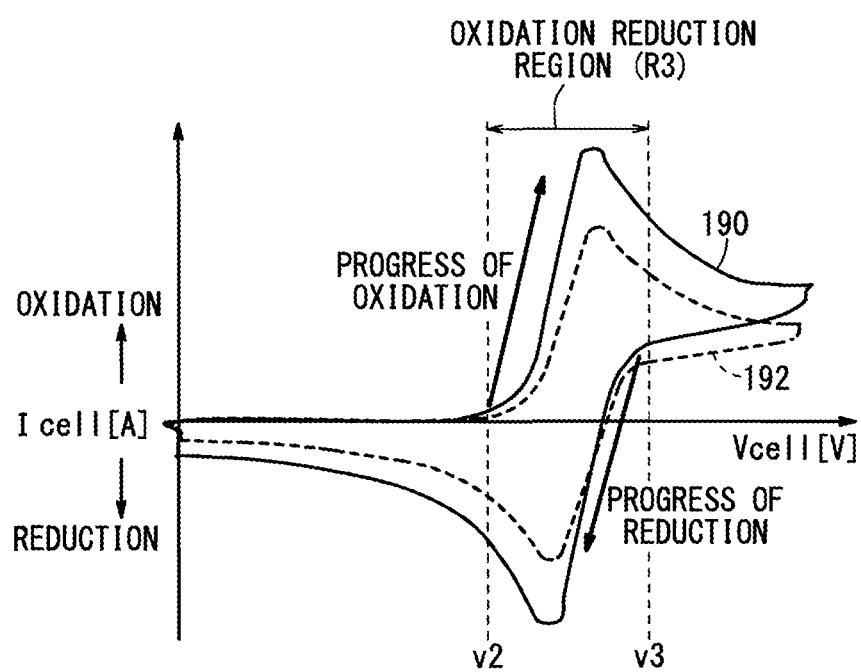
FIG. 10 is a cyclic voltammetry diagram showing an example of the progress of oxidation and the progress of reduction in the cases of different varying speeds in the electric potential of the fuel cell.

FIG. 10 is a cyclic voltammetry diagram showing an example of the progress of oxidation and the progress of reduction in the cases of different varying speeds Acell. In FIG. 10, a curve 190 shows a case where the varying speed Acell is high, and a curve 192 shows a case where the varying speed Acell is low. As can be seen from FIG. 10, since the degree of the progress in oxidation and reduction varies depending on the varying speed Acell, the electric potentials v1 to v4 cannot necessarily be determined uniquely. Further, the electric potentials v1 to v4 may change depending on the individual difference in the FC cell. Therefore, preferably, the electric potentials v1 to v4 should be set at the theoretical values, simulation values, or the measured values with the errors being taken into account.

Figure 11:
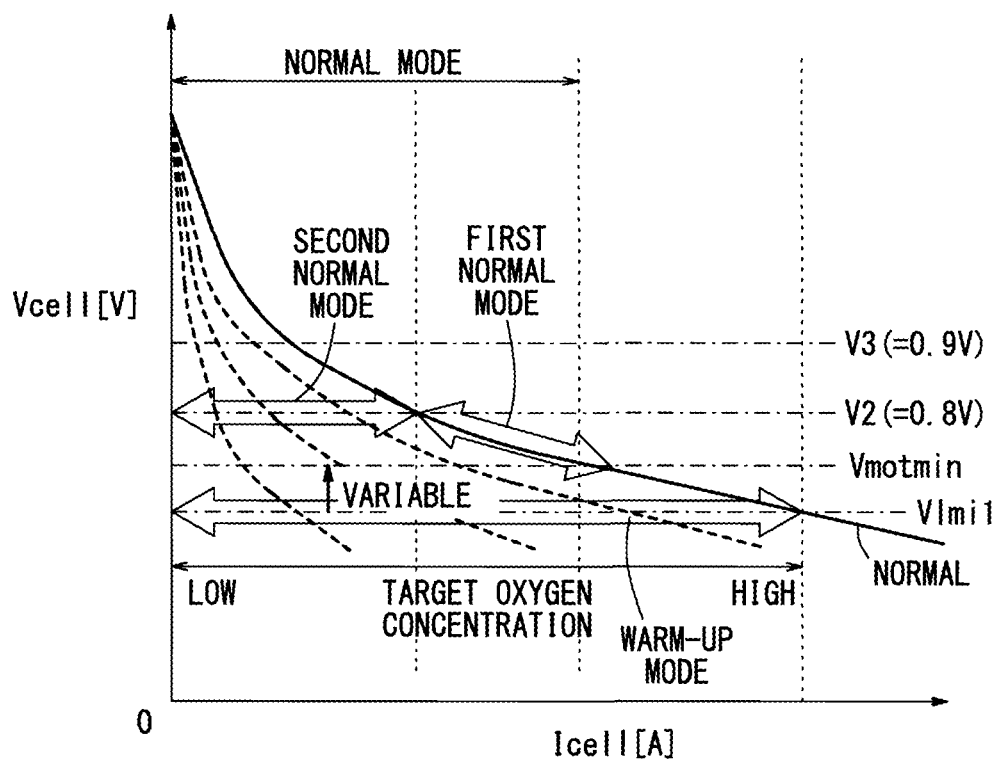
FIG. 11 is a graph showing a plurality of power supply modes in the embodiment.

Further, in the current-voltage (IV) characteristic of the FC cell, as in the case of normal fuel cells, as the cell voltage Vcell decreases, the cell current Icell [A] is increased (see FIG. 11). Additionally, the power generation voltage (FC voltage Vfc) of the FC stack 40 is obtained by multiplying the cell voltage Vcell by the serial connection number Nfc in the FC stack 40. The serial connection number Nfc indicates the number of FC cells connected in series in the FC stack 40. The serial connection number Nfc is also simply referred to as the "cell number".

In view of the above, in the present embodiment, during voltage conversion operation of the DC/DC converter 22, the target voltage (target FC voltage Vfctgt) of the FC stack 40 is mainly set within the platinum reduction region R2, and as necessary, set within the stable platinum oxidation region R4 (Specific examples will be described with reference to, e.g., FIG. 12.). By switching the target FC voltage Vfctgt in this manner, the time where the FC voltage Vfc is in the regions R1, R3, and R5 (in particular, platinum oxidation reduction progress region R3) can be reduced as much as possible, whereby degradation of the FC stack 40 can be prevented.

In the above process, the electric power supplied by the FC stack 40 (FC electric power Pfc) may not be equal to the system load Psys. In this regard, if the FC electric power Pfc is less than the system load Psys, electric power for the shortage is supplied from the battery 20. Further, if the FC electric power Pfc exceeds the system load Psys, the battery 20 is charged with the excessive electric power of the FC electric power Pfc.

In FIG. 9, the electric potentials v1 to v4 are specified as specific numeric values for implementing control as described later. The numeric values are merely determined for convenience in the control. Stated otherwise, as can be seen from the curve 180, since degradation D changes continuously, the electric potentials v1 to v4 can be determined suitably depending on the specification of control.

The platinum reduction region R2 includes a minimal value of the curve 180 (first minimal value Vlmi1). The first minimal value Vlmi1 is, for example, 0.65 V. The platinum oxidation reduction progress region R3 includes a maximal value of the curve 180 (maximal value Vlmx). The stable platinum oxidation region R4 includes another minimal value (second minimal value Vlmi2) of the curve 180.

(2-3-2. Power Supply Modes Used in Energy Management)

FIG. 11 is a graph showing a plurality of power supply modes in the present embodiment. In the present embodiment, basically, two control methods (power control modes) are used for controlling power supply (supply of electric power) in energy management. Specifically, in the embodiment of the present invention, a warm-up mode used for warming up the FC 40 and a normal mode used in normal operation (other than warming up operation) are provided. Further, the normal mode has two types, i.e., a first normal mode and a second normal mode. In the first normal mode, voltage variable/current variable control is performed in which both of the target FC voltage Vfctgt and the FC current Ifc are variable. In the second normal mode, voltage fixed/current variable control is performed in which the target FC voltage Vfctgt is fixed (constant), and the FC current Ifc is variable.

As described above, the warm-up mode is used during the warming-up operation of the FC 40. In the warm-up mode, the warming-up operation is performed while setting the target FC voltage Vfctgt to a first minimal value Vlmi1 of the reduction region R2. In this manner, the warming-up operation can be performed with small degradation D of the FC 40. In the embodiment of the present invention, the minimum drive voltage of the motor 14 (hereinafter referred to as the "minimum motor drive voltage Vmotmin") is higher than the first minimal value Vlmi1. However, the minimum motor drive voltage Vmotmin may be lower than the first minimal value Vlmi1. Also in this case, in the warm-up mode, the target FC voltage Vfctgt is set to the first minimal value Vlmi1.

The first normal mode (voltage variable/current variable control) is mainly used when the system load Psys is relatively high. In the state where the target oxygen-concentration Cotgt (air stoichiometric ratio) is fixed (or oxygen is kept in a rich state), the target FC voltage Vfctgt is adjusted to control the FC current Ifc. In this manner, basically, the system load Psys can be covered with the FC electric power Pfc.

The second normal mode (voltage fixed/current variable control) is mainly used when the system load Psys is relatively low. The target cell voltage Vcelltgt (=target FC voltage Vfctgt/cell number) is fixed to a reference electric potential (in the present embodiment, the electric potential v2 (=0.8 v)) which is equal to or less than an electric potential below the oxidation reduction region R3, and the target oxygen concentration Cotgt (air stoichiometric ratio) is variable, whereby FC electric current Ifc is made variable. In this manner, basically, it becomes possible to cover the system load Psys with the FC electric power Pfc (as described later in detail). The shortage of the FC electric power Pfc is supplemented with assistance of the battery 20.

(2-3-3. Overflow of Energy Management)

Figure 12:
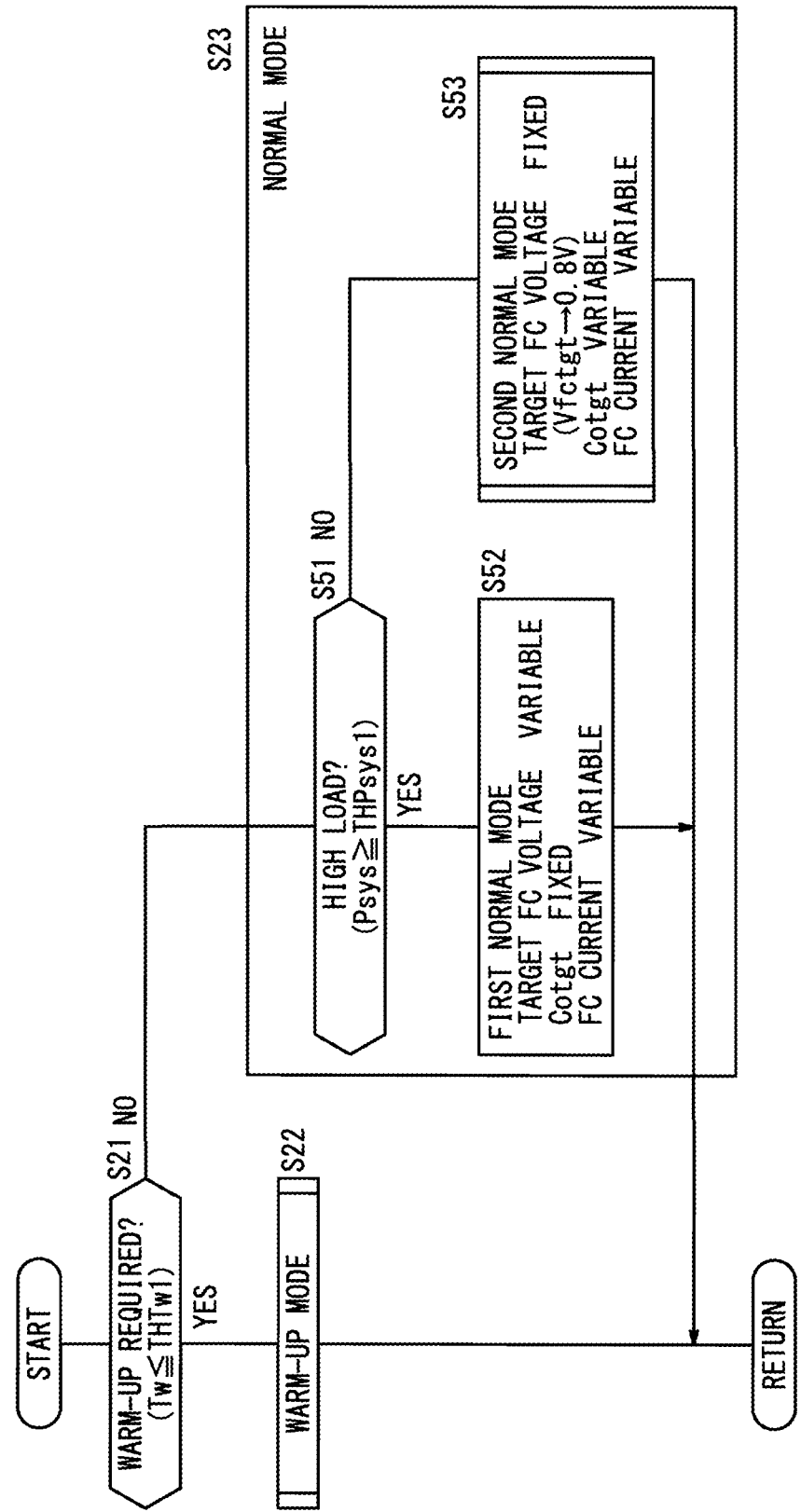
FIG. 12 is a flow chart where the ECU performs energy management of the fuel cell system.

FIG. 12 is a flow chart where the ECU 24 performs energy management (S3 of FIG. 5) of the FC system 12. In step S21, the ECU 24 determines whether or not the FC 40 needs to be warmed up. Specifically, the ECU 24 determines whether or not the temperature Tw of the coolant water detected by the temperature sensor 86 is equal to or less than a threshold value THTw1 for determining whether or not warm-up is required. In the case where the temperature Tw is the threshold value THTw1 or less, and warm-up is required (S21: YES), in step S22, the ECU 24 performs the warm-up mode. If the temperature Tw is more than the threshold value THTw1, and warm-up is not required (S21: NO), in step S23, the ECU 24 performs the normal mode.

(2-3-4. Warm-Up Mode)

Figure 13:
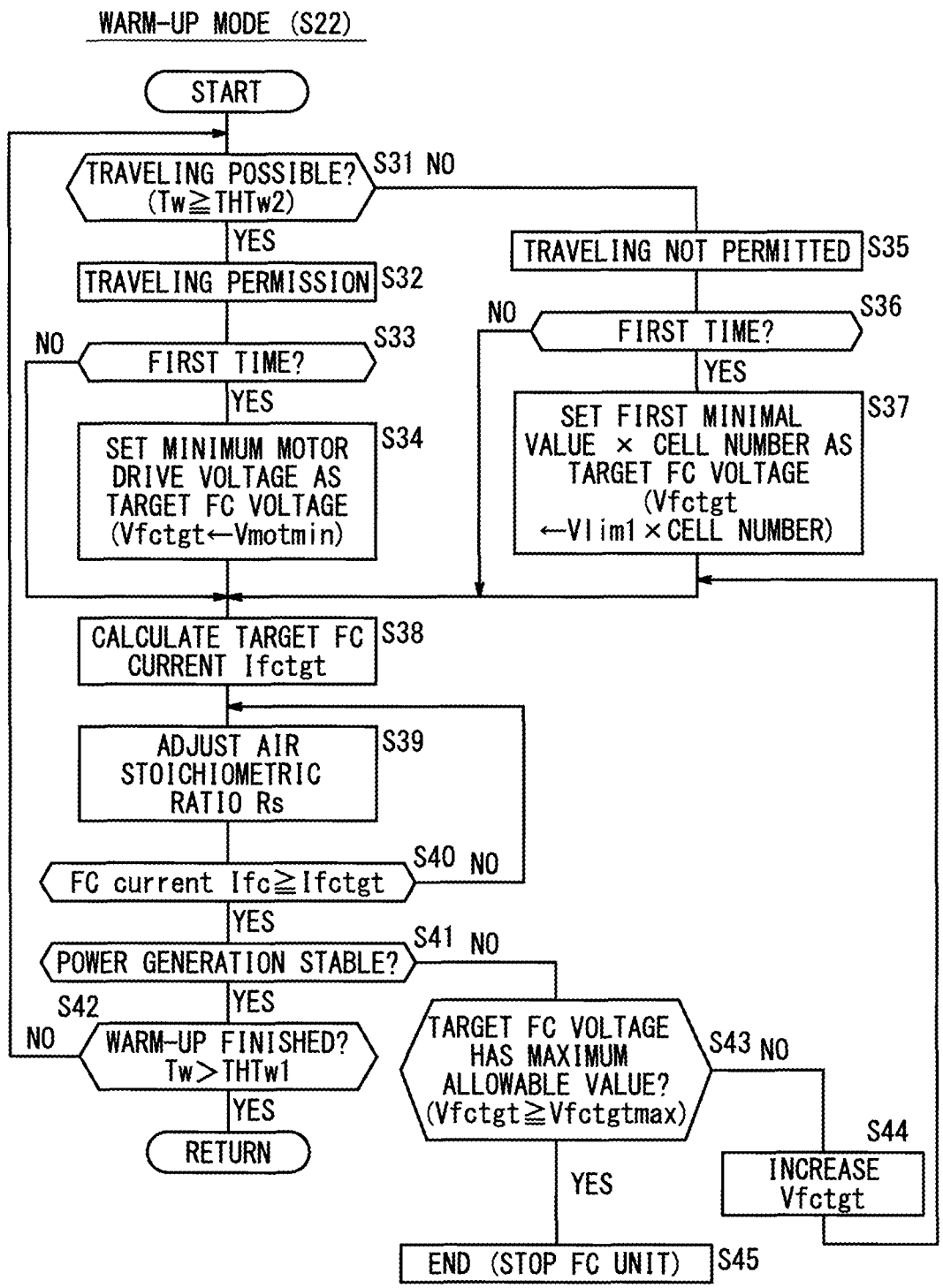
FIG. 13 is a flow chart of a warm-up mode.

FIG. 13 is a flow chart of the warm-up mode. In step S31, the ECU 24 determines whether or not the FC 40 has been warmed up enough to allow traveling of the vehicle 10. Specifically, the ECU 24 determines whether or not the temperature Tw of the coolant water is the threshold value THTw2 or more. In effect, the temperature Tw indicates the temperature of the FC 40. If the temperature Tw is the threshold value THTw2 or more, and the vehicle 10 can travel (S31: YES), then the process proceeds to step S32.

In step S32, the ECU 24 permits traveling of the vehicle 10 (driving of the motor 14). That is, depending on the opening degree θp of the accelerator pedal 156, the output of the motor 14 is controlled. In step S33, the ECU 24 determines whether or not it is the first time to perform step S33 after the warm-up mode is started. If it is not the first time to perform step S33 (S33: NO), the process proceeds to step S38. If it is the first time to perform step S33 (S33: YES), in step S34, the ECU 24 sets the minimum motor drive voltage Vmotmin as the target FC voltage Vfctgt. After step S34, the process proceeds to step S38.

In step S31, if the temperature Tw is less than the threshold value THTw2, and the vehicle 10 cannot travel (S31: NO), then the process proceeds to step S35.

In step S35, the ECU 24 does not permit traveling of the vehicle (driving of the motor 14). That is, even if the accelerator pedal 156 is operated, the motor 14 is not activated. In step S36, the ECU 24 determines whether or not it is the first time to perform this step S36 after the warm-up mode is started. If it is not the first time to perform step S36 (S36: NO), the process proceeds to step S38. If it is the first time to perform step S36 (S36: YES), in step S37, the ECU 24 sets the product of the first minimal value Vlmi1 and the cell number as the target FC voltage Vfctgt. After step S37, the process proceeds to step S38.

In step S38, the ECU 24 calculates the target FC current Ifctgt in correspondence with the system load Psys calculated in step S17 of FIG. 6. In step S39, the ECU 24 adjusts the air stoichiometric ratio Rs (in the embodiment, target oxygen concentration Cotgt) depending on the target FC voltage Vfctgt and the target FC current Ifctgt. That is, in the state where the target FC voltage Vfctgt is fixed at the first minimal value Vlmi×cell number, the ECU 24 calculates the air stoichiometric ratio Rs which realizes the target FC current Ifctgt. In this calculation, a map showing the relationship between the target FC voltage Vfctgt and the target FC current Ifctgt, and the air stoichiometric ratio Rs is prepared beforehand, and this map is used to determine the air stoichiometric ratio which realizes the target FC current Ifctgt.

In step S40, the ECU 24 determines whether or not the FC current Ifc detected by the current sensor 102 is the target FC current Ifctgt or more. If the FC current Ifc is less than the target FC current Ifctgt (S40: NO), the control returns to step S39, and the air stoichiometric ratio Rs is further increased. If the FC current Ifc is equal to or more than the target FC current Ifctgt (S40: YES), in step S41, the ECU 24 determines whether or not power generation is stably performed by the FC 40. In the determination, if the lowest cell voltage inputted from the cell voltage monitor 42 is lower than the voltage obtained by subtracting a predetermined voltage from the average cell voltage (lowest cell voltage<(average cell voltage−predetermined voltage)), then the ECU 24 determines that power generation of the FC 40 is not stable. For example, experimental values, simulation values or the like may be used as the predetermined voltage.

If power generation of the FC 40 is stable (S41: YES), in step S42, the ECU 24 determines whether or not warm-up of the FC 40 has been finished. Specifically, it is determined whether or not the temperature Tw of the coolant water exceeds the threshold value THTw1. If the temperature Tw is the threshold value THTw1 or less, and warm-up has not been finished (S42: NO), then the process returns to step S31. If the temperature Tw exceeds the threshold value THTw1, and warm-up has been finished (S42: YES), the current process is finished.

In step S41, if power generation of the FC 40 is not stable (S41: NO), then in step S43, the ECU 24 determines whether or not the target FC voltage Vfctgt is equal to or more than the maximum allowable value Vfctgtmax in the warm-up mode. If the target FC voltage Vfctgt is less than the maximum allowable value Vfctgtmax (S43: NO), in step S44, the ECU 24 increases the target FC voltage Vfctgt by one stage, and then the process returns to step S38. If the target FC voltage Vfctgt is the maximum allowable value Vfctgtmax or more (S43: YES), in step S45, the ECU 24 stops operation of the FC unit 18. That is, the ECU 24 stops supply of hydrogen and air to the FC 40 thereby to stop power generation of the FC 40. Then, the ECU 24 turns on an alarming lamp (not shown) thereby to notify the driver that there is a failure in the FC 40. It should be noted that the ECU 24 supplies electric power from the battery 20 to the motor 14 for allowing the FC vehicle 10 to continue traveling.

Figure 14:
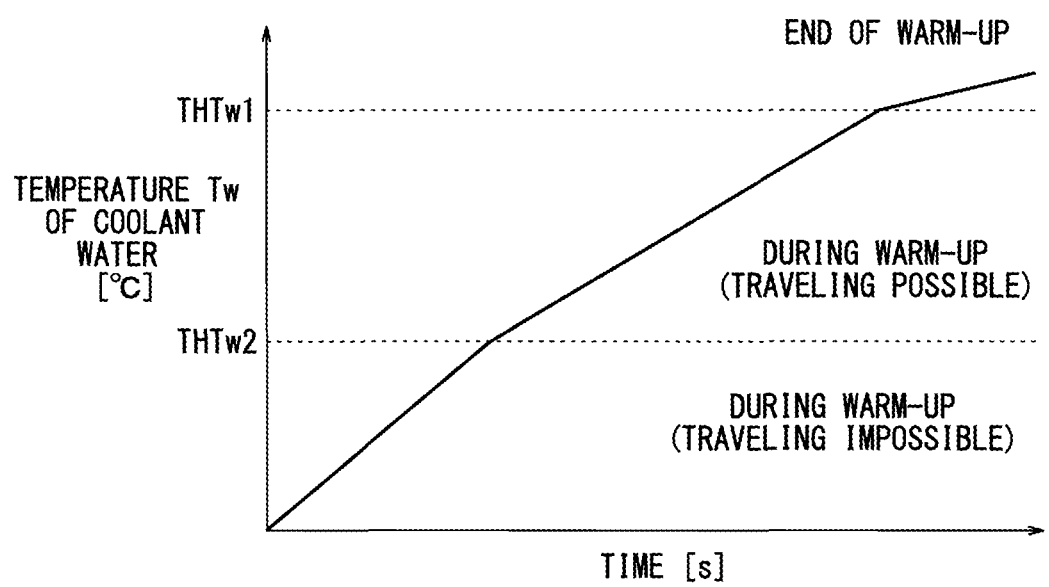
FIG. 14 is a graph showing an example of a manner where the temperature of coolant water is raised by an warming-up operation.

According to the flow chart of FIG. 13, the temperature Tw of the coolant water is raised, e.g., as shown in FIG. 14. Specifically, if the temperature Tw is less than the threshold value THTw2, then the warm-up of the FC 40 is performed with the first minimal value Vlmi1×cell number being set to the target FC voltage Vfctgt (If power generation is not stable, a higher voltage value is set to the target FC voltage Vfctgt.). If the temperature Tw is in a range between the threshold value THTw2 and the threshold value THTw1, then the warm-up of the FC 40 is performed with the minimum motor drive voltage Vmotmin being set to the target FC voltage (If power generation is not stable, a higher voltage value is set to the target FC voltage Vfctgt.). If the temperature value Tw exceeds the threshold THTw1, the warm-up is finished.

(2-3-5. Normal Mode)

A flowchart of the normal mode is shown in step S23 of FIG. 12. In step S51, the ECU 24 determines whether or not the system load Psys calculated in step S2 is equal to or more than a threshold value THPsys1 for determining whether or not the system load Psys is high. If the system load Psys is equal to or more than the threshold value THPsys1 (S51: YES), in step S52, the ECU 24 performs the first normal mode (implements voltage variable/current variable control).

In step S51, in the case where the system load Psys is less than the threshold value THPsys1, (S51: NO), in step S53, the ECU 24 performs the second normal mode (implements voltage fixed/current variable control).

(2-3-6. First Normal Mode)

As described above, the first normal mode is mainly used when the system load Psys is relatively high. In the state where the target oxygen concentration Cotgt (air stoichiometric ratio Rs) is fixed (or oxygen is kept in a rich state), the target FC voltage Vfctgt is adjusted to control the FC current Ifc.

That is, as shown in FIG. 11, in the first normal mode, a normal current-voltage characteristic of a FC 40 (I-V characteristic indicated by a solid line in FIG. 11) is used. As in the case of the normal fuel cell, in the I-V characteristic of the FC 40, as the cell voltage Vcell (FC voltage Vfc) decreases, the cell current Icell (FC current Ifc) is increased. Thus, in the first normal mode, the target FC current Ifctgt is calculated depending on the system load Psys, and the target FC voltage Vfctgt is calculated in correspondence with the target FC current Ifctgt. The ECU 24 controls the DC/DC converter 22 such that the FC voltage Vfc is adjusted to the target FC voltage Vfctgt. That is, the primary voltage V1 is elevated by the DC/DC converter 22 such that the secondary voltage V2 is adjusted to the target FC voltage Vfctgt, whereby the FC voltage Vfc is controlled and the FC current Ifc is controlled.

Figure 15:
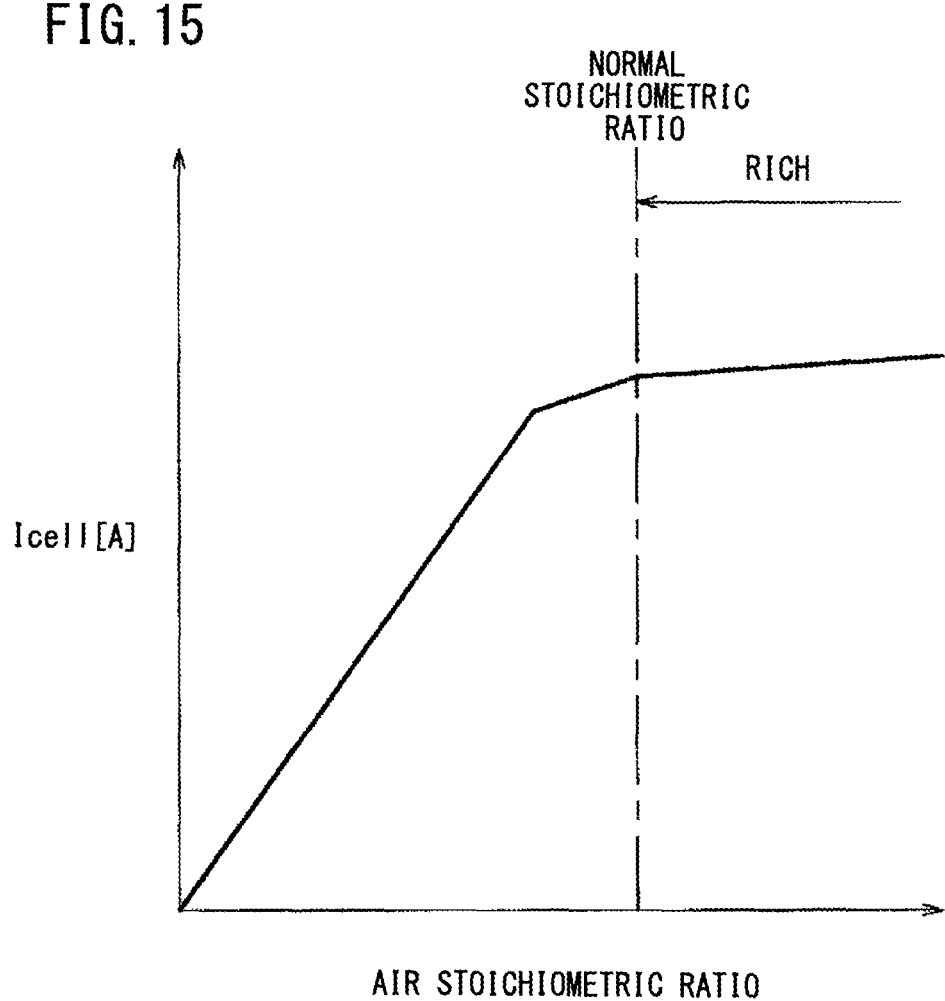
FIG. 15 is a graph showing the relationship between the air stoichiometric ratio and the cell current.

The expression "oxygen is in a rich state" means that oxygen is in a state where, for example, as shown in FIG. 15, the cell current Icell is kept at a constant level even if the cathode stoichiometric ratio is increased. In this state, oxygen is present at the normal stoichiometric ratio or more where oxygen is substantially saturated. The meaning of the expression "hydrogen is in a rich state" can be understood in the same manner. The air stoichiometric ratio Rs is adjusted, e.g., by controlling oxygen concentration.

In the first normal mode as described above, even if the system load Psys is high, basically, the entire system load Psys can be covered with the FC electric power Pfc.

(2-3-7. Second Normal Mode)

As described above, the second normal mode is mainly used when the system load Psys is relatively low. The target cell voltage Vcelltgt (=target FC voltage Vfctgt/cell number) is fixed to a reference electric potential (in the present embodiment, the electric potential v2 (=0.8 v)) which is equal to or less than an electric potential below the oxidation reduction region R3, and the target oxygen concentration Cotgt is variable. Thus, the FC current is variable.

That is, as shown in FIG. 11, in the second normal mode, while the cell voltage Vcell is kept at a constant level, the oxygen concentration Co is decreased by decreasing the target oxygen concentration Cotgt (air stoichiometric ratio Rs). As shown in FIG. 15, when the air stoichiometric ratio Rs (oxygen concentration Co) is decreased, the cell current Icell (FC current Ifc) is accordingly decreased. Therefore, in the state where the cell voltage Vcell is kept at a constant level, by increasing or decreasing the target oxygen concentration Cotgt, it becomes possible to control the cell current Icell (FC current Ifc) and the FC electric power Pfc. The shortage of the FC electric power Pfc is supplemented with assistance of the battery 20.

Figure 16:
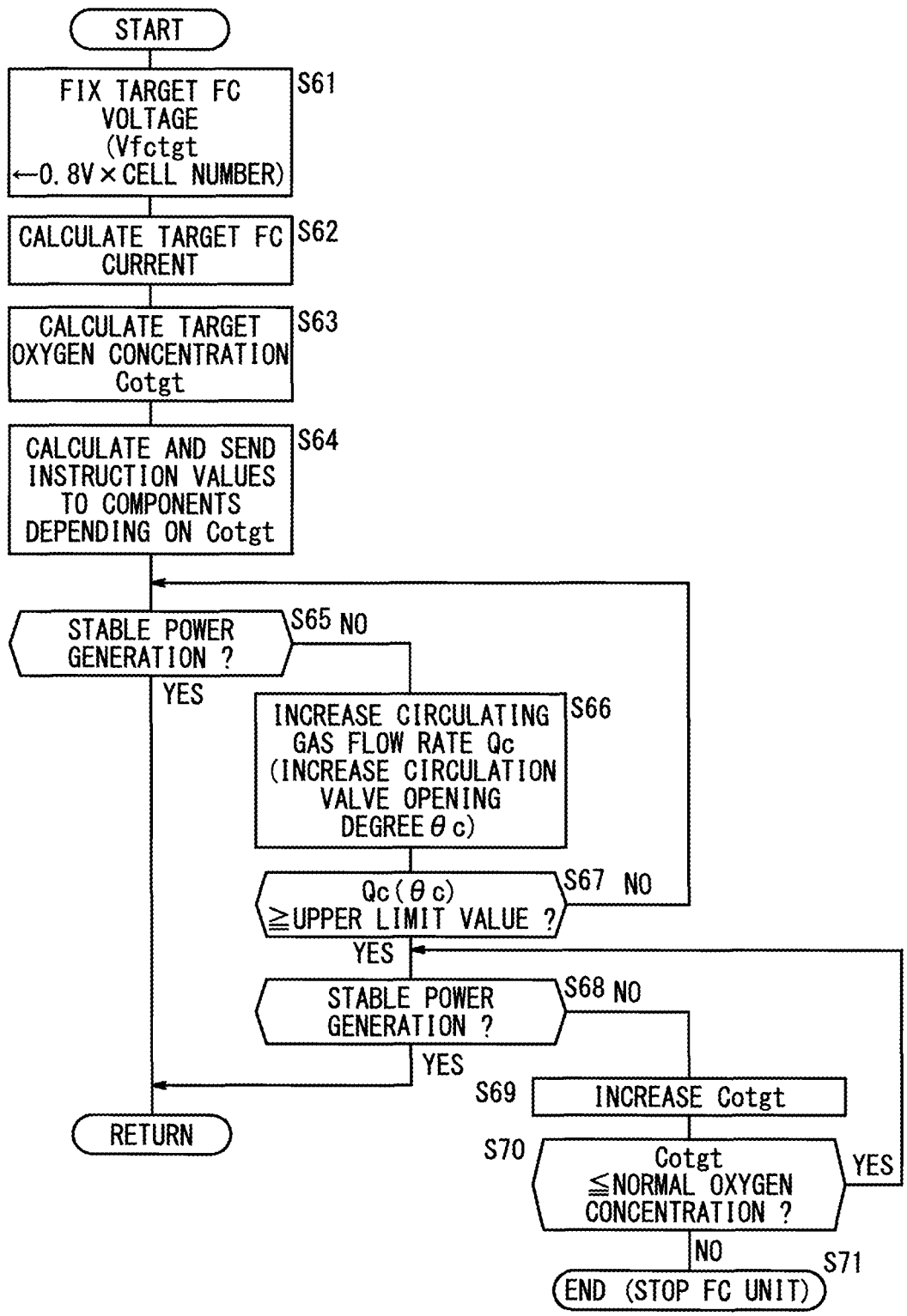
FIG. 16 is a flowchart of a second normal mode.

FIG. 16 is a flow chart showing the second normal mode. In step S61, the ECU 24 fixes the target FC voltage Vfctgt to a reference electric potential (in the present embodiment, the electric potential v2 (=0.8 v)) by adjusting the voltage elevating rate of the DC/DC converter 22, the reference electric potential being set to be equal to or less than an electric potential below the oxidation reduction region R3. In step S62, the ECU 24 calculates the target FC current Ifctgt in correspondence with the system load Psys.

Figure 17:
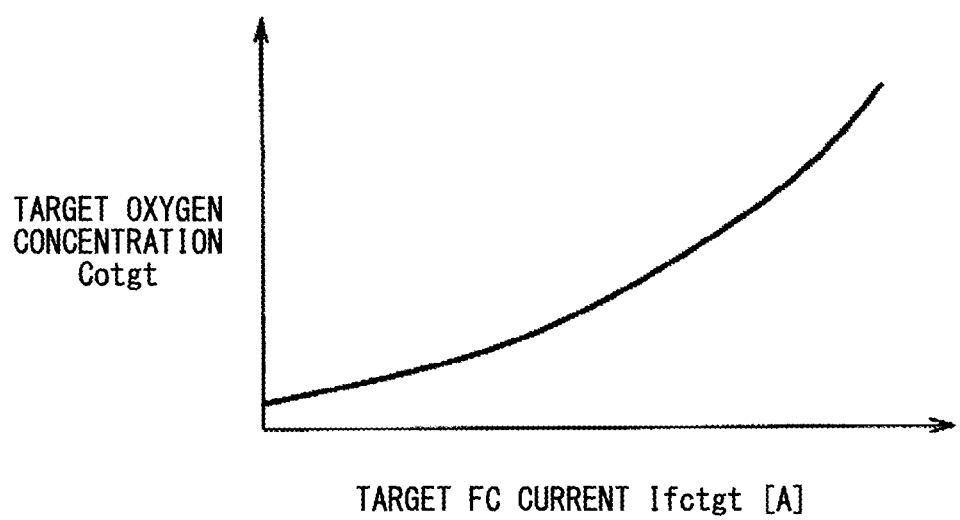
FIG. 17 is a graph showing the relationship between the target FC current and the target oxygen concentration.

In step S63, the ECU 24 calculates the target oxygen concentration Cotgt in correspondence with the target FC current Ifctgt on the premise that the target FC voltage Vfctgt is at the reference electric potential (see FIGS. 11 and 17). FIG. 17 shows the relationship between the target FC current Ifctgt and the target oxygen concentration Cotgt when the FC voltage Vfc is at the reference electric potential.

In step S64, depending on the target oxygen concentration Cotgt, the ECU 24 calculates and sends instruction values to the respective components. The instruction values herein include the rotation number of the air pump 60 (air pump rotation number Nap), the rotation number of the water pump 80 (water pump rotation number Nwp), the opening degree of the back pressure valve 64 (hereinafter referred to as the "back pressure valve opening degree θbp" or the "opening degree θbp") and the opening degree of the circulation valve 66 (hereinafter referred to as the "circulation valve opening degree θc" or the "opening degree θc".

Figure 18:
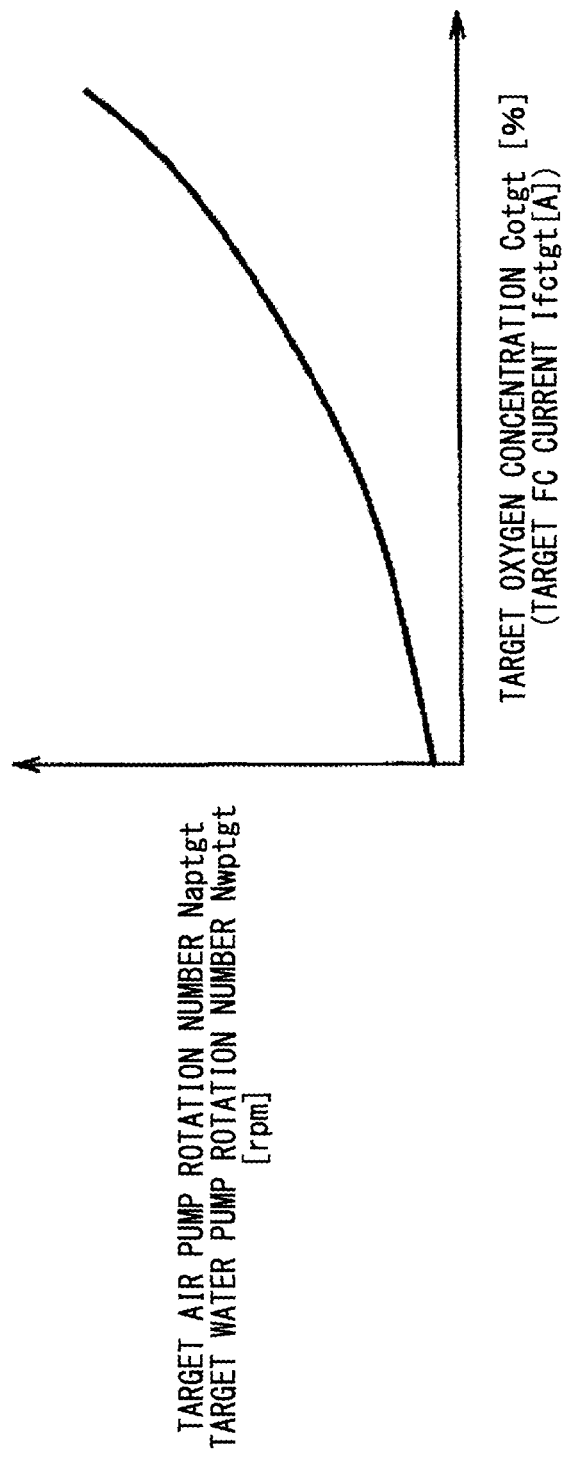
FIG. 18 is a graph showing the relationship between the target oxygen concentration and target FC current, and the target air pump rotation number and the target water pump rotation number.
Figure 19:
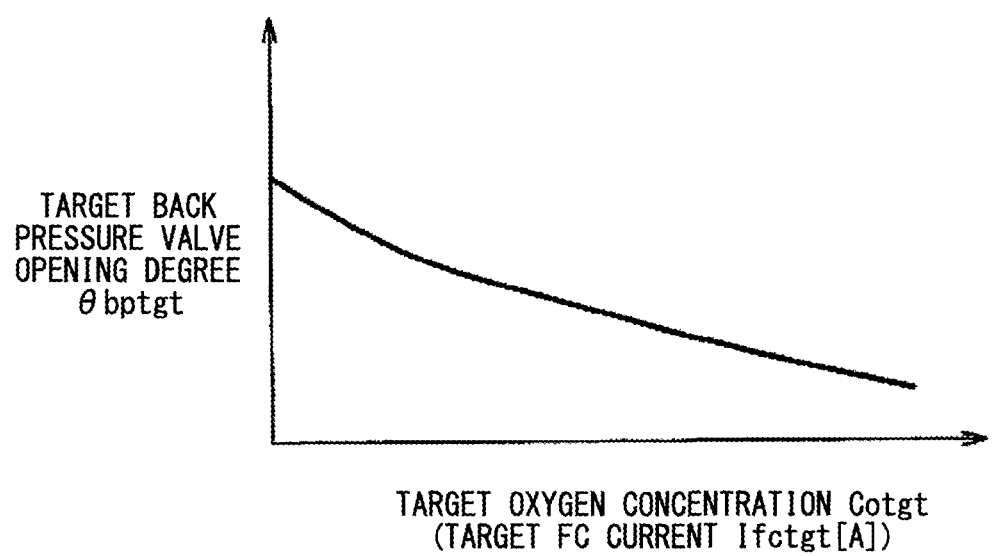
FIG. 19 is a graph showing the relationship between the target oxygen concentration and the target FC current, and the target opening degree of a back pressure valve.

That is, as shown in FIGS. 18 and 19, the target air pump rotation number Naptgt, the target water pump rotation number Nwptgt, and the target back pressure valve opening degree θbptgt are determined depending on the target oxygen concentration Cotgt. Further, the target opening degree θctgt of the circulation valve 66 is set to an initial value (opening degree where no circulating gas is present).

In step S65, the ECU 24 determines whether power generation by the FC 40 is stably performed or not. In the determination, if the lowest cell voltage inputted from the cell voltage monitor 42 is lower than the voltage obtained by subtracting a predetermined voltage from the average cell voltage (lowest cell voltage<(average cell voltage−predetermined voltage)), the ECU 24 determines that power generation of the FC 40 is not stable. For example, experimental values, simulation values or the like may be used as the predetermined voltage.

Figure 20:
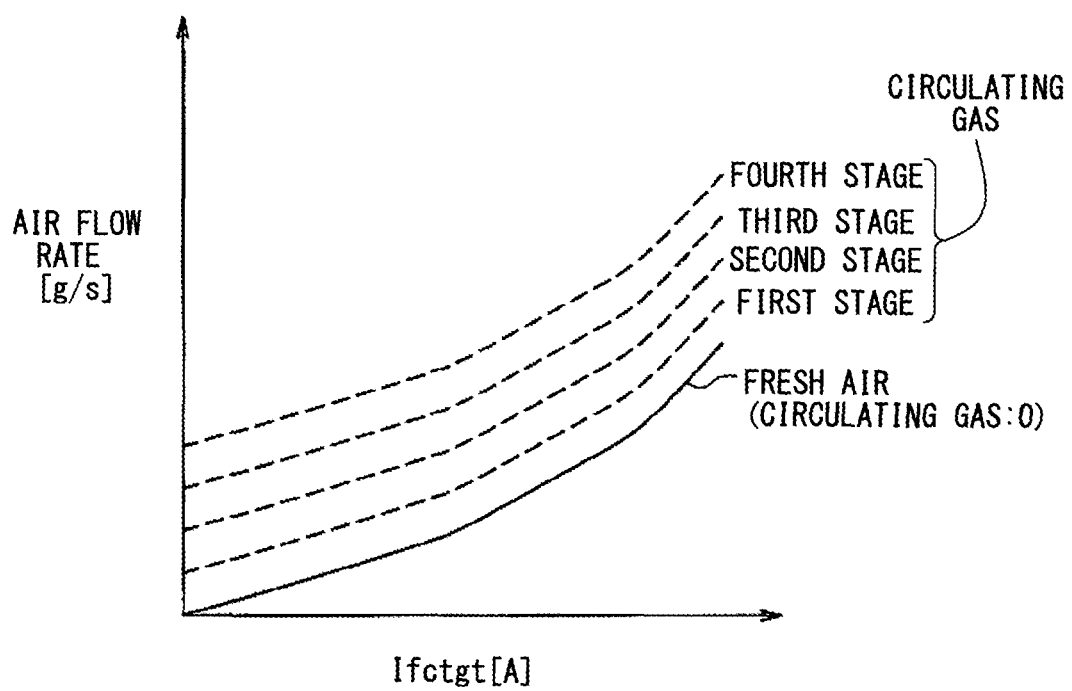
FIG. 20 is a graph showing the relationship between the target FC current and the flow rate of air.

If power generation is stable (S65: YES), the current process is finished. If power generation is not stable (S65: NO), in step S66, the ECU 24 monitors the flow rate Qc [g/s] of the circulating gas through the flow rate sensor 70, increases the opening degree θc of the circulation valve 66, and increases the flow rate Qc by one stage (see FIG. 20). FIG. 20 shows a case where when the circulation valve 66 is fully opened, the flow rate Qc is increased to the fourth stage, to the maximum flow rate.

When the opening degree θc of the circulation valve 66 is increased, in the suction gas sucked into the air pump 60, the proportion of the circulating gas is increased. That is, in the suction gas, the proportion of the circulating gas is increased in the ratio between the fresh air (air sucked from the outside of the vehicle) and the circulating gas. Therefore, improvement in the capability of distributing oxygen to all the unit cells is achieved. The oxygen-concentration of the circulating gas (cathode off gas) is low in comparison with the oxygen concentration of the fresh air. Therefore, if the rotation number Nap of the air pump 60 and the opening degree θbp of the back pressure valve 64 are the same before and after control of the opening degree θc of the circulation valve 66, the oxygen concentration of the gas flowing through the cathode channel 74 is decreased.

Thus, in step S66, preferably, at least one of the control to increase the rotation number Nap of the air pump 60 and the control to decrease the opening degree θbp of the back pressure valve 64 is implemented in association with the increase in the flow rate Qc of the circulating gas such that the target oxygen concentration Cotgt calculated in step S63 is maintained.

For example, in the case where the flow rate Qc of the circulating gas is increased, it is preferable to increase the rotation number Nap of the air pump 60 thereby to increase the flow rate of the fresh air. By this operation, since the flow rate of the gas (mixed gas of the fresh air and the circulating gas) flowing toward the cathode channel 74 is increased as a whole, further improvement in the capability of distributing oxygen to all the unit cells is achieved, and the power generation performance of the FC 40 can be recovered easily.

In this manner, since the circulating gas is merged with the fresh air while the target oxygen concentration Cotgt is maintained, the volume flow rate (L/s) of the gas flowing through the cathode channel 74 is increased. Thus, since the volume flow rate of the gas is increased while the target oxygen-containing gas concentration Cotgt is maintained, the gas can be distributed smoothly to the entire cathode channel 74 formed in the FC 40 in a complicated manner. The gas can also be supplied to each of the unit cells easily, and instable power generation of the FC 40 can be avoided easily. Further, water droplets (e.g., condensed water) attached to surfaces of MEAs (membrane electrode assemblies) or wall surfaces surrounding the cathode channel 74 can be removed easily.

In step S67, the ECU 24 determines whether or not the flow rate Qc of the circulating gas detected by the flow rate sensor 70 is equal to or more than the upper limit value. The upper limit value serving as the determination criterion is set to a value where the opening degree θc of the circulation valve 66 is fully opened.

In this case, even in a case where the opening degree θc of the circulation valve 66 does not change, if the rotation number Nap of the air pump 60 is increased, the flow rate Qc of the circulating gas detected by the flow rate sensor 70 is increased. Therefore, preferably, the upper limit value is associated with the air pump rotation number Nap, that is, if the rotation number Nap of the air pump 60 becomes large, the upper limit value is increased.

If it is determined that the flow rate Qc of the circulating gas is less than the upper limit (S67: NO), the process returns to step S65. If it is determined that the flow rate Qc of the circulating gas is equal to or more than the upper limit (S67: YES), the process proceeds to step S68.

In steps S66 and S67, the process is carried out based on the flow rate Qc of the circulating gas detected directly by the flow rate sensor 70. Alternatively, the process may be carried out based on the circulation valve opening degree θc. That is, in step S66, the circulating valve opening degree θc may be increased in increments of one stage (e.g., 30°), and in step S67, if the circulation valve 66 is fully opened (S67: YES), the process may proceed to step S68.

Figure 21:
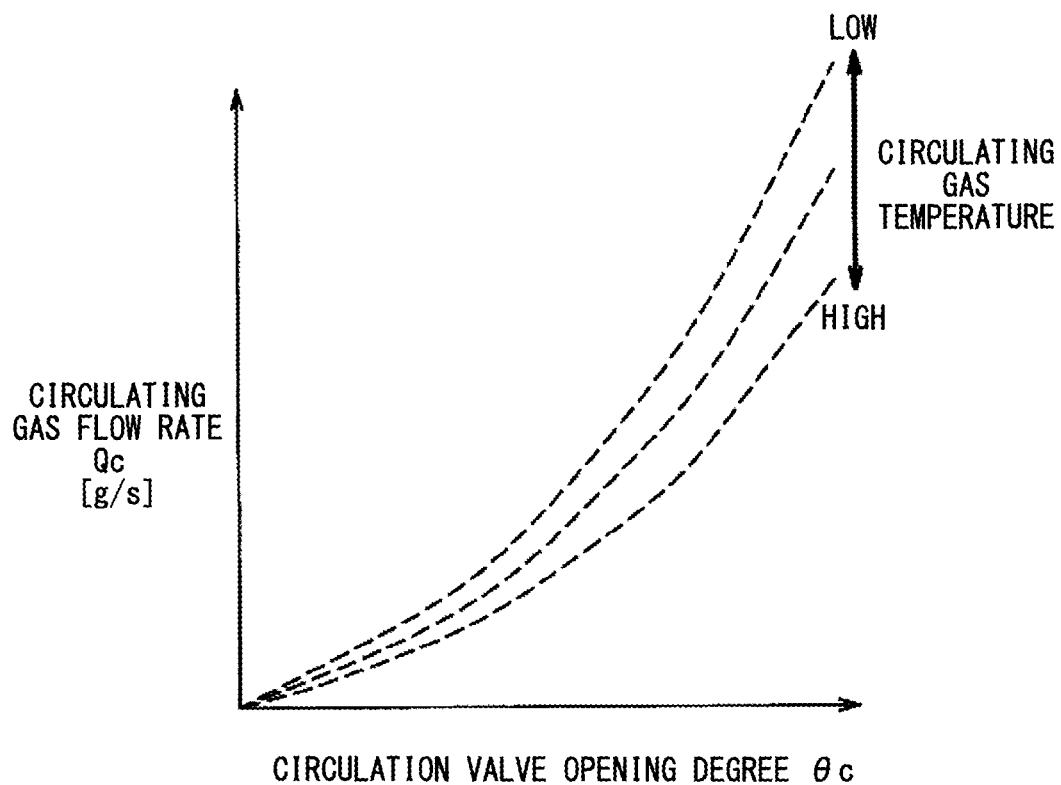
FIG. 21 is a graph showing the relationship between the opening degree of a circulation valve and the flow rate of a circulating gas.

Further, in this case, the flow rate Qc [g/s] of the circulating gas may be calculated based on the opening degree θc of the circulation valve 66, the temperature of the circulating gas, and the map in FIG. 21. In the relationship shown in FIG. 21, as the temperature of the circulating gas increases, the density of the circulating gas becomes low, and thus the flow rate Qc [g/s] becomes low.

In step S68, in the same manner as step S65, the ECU 24 determines whether or not power generation is performed stably. If power generation is performed stably (S68: YES), the current process is finished. If power generation is not performed stably (S68: NO), in step S69, the ECU 24 increase the target oxygen concentration Cotgt by one stage (closer to the normal concentration). More specifically, at least one of increasing the rotation number Nap of the air pump 60 and decreasing the opening degree θbp of the back pressure valve 64 is performed by one stage.

In step S70, the ECU 24 determines whether or not the target oxygen concentration Cotgt is equal to or less than the target oxygen concentration of the normal I-V characteristic (normal oxygen concentration Conml). If the target oxygen concentration Cotgt is equal to or less than the normal oxygen concentration Conml (S70: YES), the process returns to step S68. If the target oxygen concentration Cotgt is more than the normal oxygen concentration Conml (S70: NO), in step S71, the ECU 24 stops operation of the FC unit 18. That is, the ECU 24 stops supply of hydrogen and air to the FC 40 thereby to stop power generation of the FC 40. Then, the ECU 24 turns on an alarming lamp (not shown) to notify the operator that there is a failure in the FC 40. It should be noted that the ECU 24 supplies electric power from the battery 20 to the motor 14 for allowing the FC vehicle 10 to continue running.

In the second normal mode as described above, when the system load Psys is relatively low, the cell voltage Vcell is decreased from the electric potential v2. In this manner, basically, the entire system load Psys can be covered with the FC electric power Pfc.

[2-4. FC Power Generation Control]

As described above, as FC power generation control (S4 of FIG. 5), the ECU 24 controls peripheral devices of the FC stack 40, i.e., the air pump 60, the back pressure valve 64, the circulation valve 66, and the water pump 80. Specifically, the ECU 24 controls these devices using instruction values (e.g., S64 of FIG. 16) calculated in energy management (S3 of FIG. 5).

[2-5. Torque Control of Motor 14]

Figure 22:
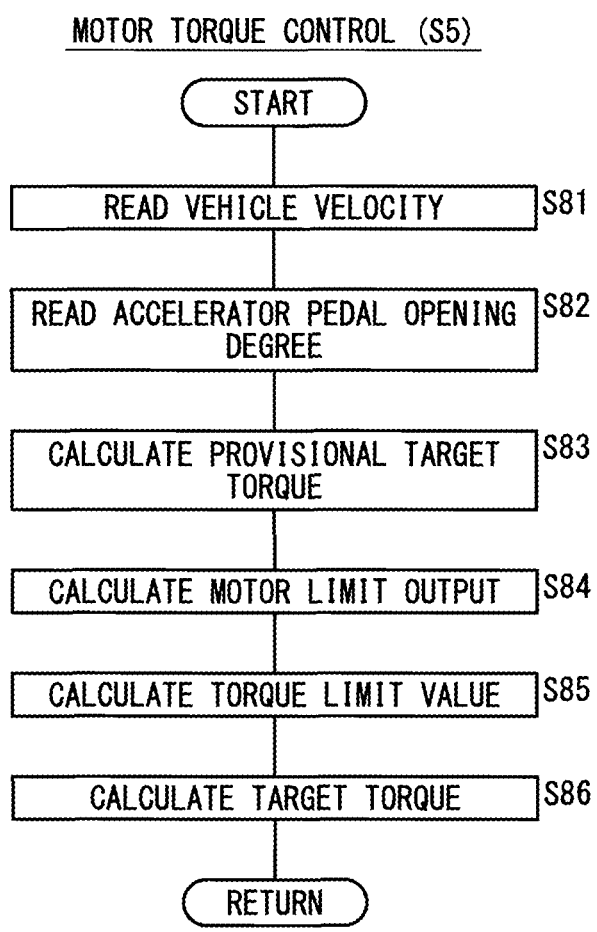
FIG. 22 is a flow chart showing torque control of the motor.

FIG. 22 is a flow chart of torque control of the motor 14. In step S81, the ECU 24 reads the vehicle velocity V from the vehicle velocity sensor 154. In step S82, the ECU 24 reads the opening degree θp of the accelerator pedal 156 from the opening degree sensor 150.

In step S83, the ECU 24 calculates the provisional target torque Ttgt_p [N·m] of the motor 14 based on the vehicle velocity V and the opening degree θp. Specifically, a map of data indicating association of the vehicle velocity V and the opening degree θp with the provisional target torque Ttgt_p is stored in memory means (not shown), and the provisional target torque Ttgt_p is calculated based on the map, the vehicle velocity V, and the opening degree θp.

In step S84, the ECU 24 calculates a limit output (motor limit output Pm_lim) [W] of the motor 14, which is equal to the limit value (limit supply electric power Ps_lim) [W] of the electric power which can be supplied from the FC system 12 to the motor 14. Specifically, the limit supply electric power Ps_lim and the motor limit output Pm_lim can be calculated by subtracting electric power Pa consumed by the auxiliary devices from the sum of the FC electric power Pfc from the FC stack 40 and the limit value (limit output Pbat_lim) [W] of electric power which can be supplied from the battery 20 (Pm_lim=Ps_lim←Pfc+Pbt_lim−Pa).

In step S85, the ECU 24 calculates the torque limit value Tlim [N·m] of the motor 14. Specifically, a value calculated by dividing the motor limit output Pm_lim by the vehicle velocity V is used as the torque limit value Tlim (Tlim←Pm_lim/V).

In step S86, the ECU 24 calculates the target torque Ttgt [N·m]. Specifically, the ECU 24 determines the target torque Ttgt by adding a limitation based on the torque limit value Tlim to the provisional target torque Ttgt_p. For example, if the provisional target torque Ttgt_p is equal to or less than the torque limit value Tlim (Ttgt_p≤Tlim), the provisional target torque Ttgt_p is directly used as the target torque Ttgt (Ttgt←Ttgt_p). If the provisional target torque Ttgt_p exceeds the torque limit value Tlim (Ttgt_p>Tlim), the torque limit value Tlim is used as the target torque Ttgt (Ttgt←Tlim).

Then, the motor 14 is controlled using the calculated target torque Ttgt.

3. Examples of Various Controls

Figure 23:
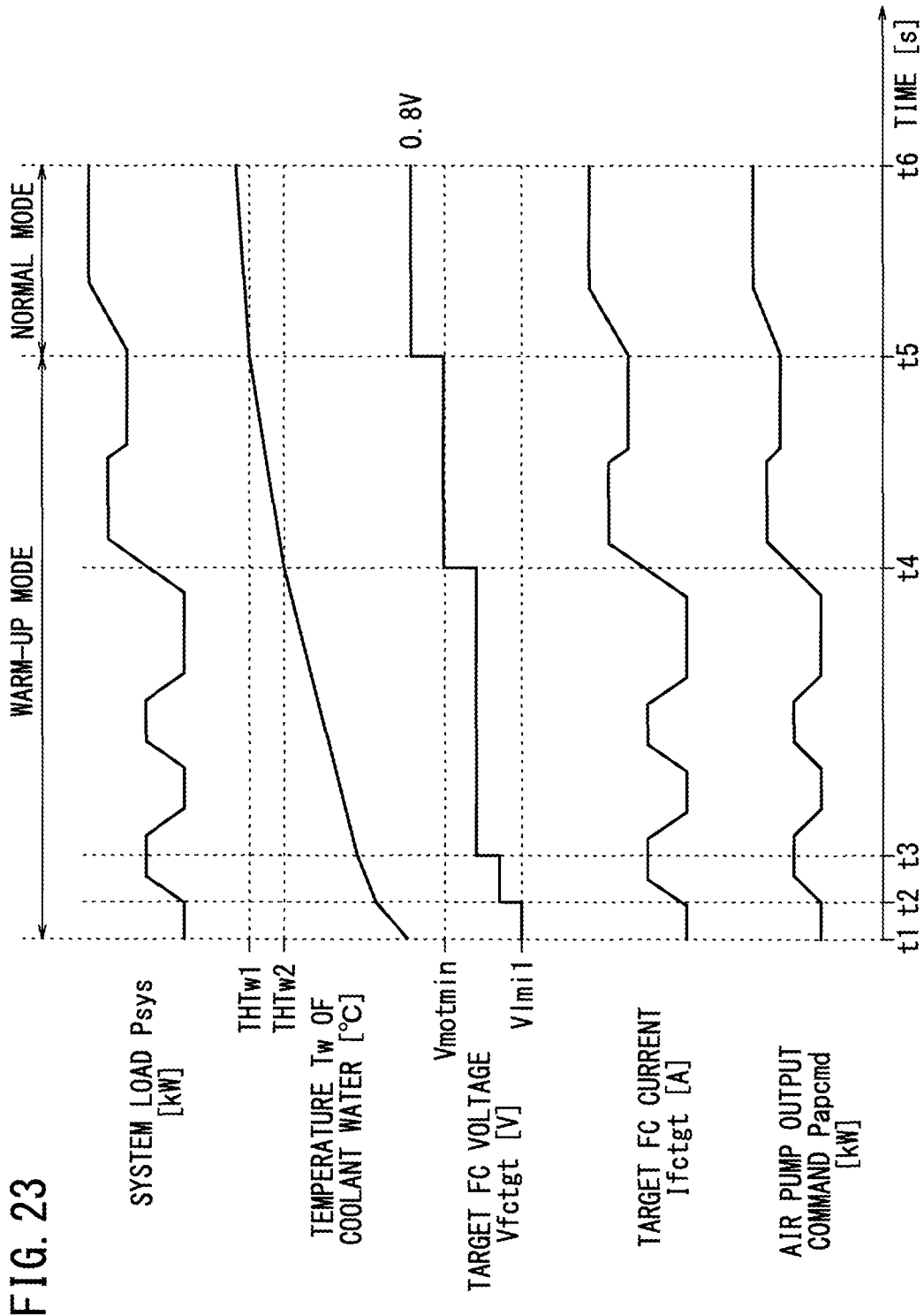
FIG. 23 is an example of a time chart in the case where various controls according to the embodiment are used.

FIG. 23 shows an example of a time chart in a case where various controls according to the present embodiment are used. From time t1 to time t5, since the temperature Tw of the coolant water is the threshold value THTw1 or less, the warm-up mode is selected. From a time point immediately after time t5 to time t6, since the temperature Tw of the coolant water exceeds the threshold value THTw1, the normal mode is selected.

From time t1 to time t3, since power generation of the fuel cell 40 has not been stabilized (S41 of FIG. 13: NO), the target FC voltage Vfctgt is increased stepwise (S44). From a time point immediately after time t3 to time t4, power generation of the FC 40 is stable (S41 of FIG. 13: YES), and the target FC voltage Vfctgt is fixed.

At time t4, the temperature Tw of the coolant water reaches the threshold value THTw2, and then traveling of the vehicle 10 becomes possible (S31: YES). Subsequently, the target FC voltage Vfctgt is set to the minimum motor drive voltage Vmotmin (S34).

At time t5, the temperature Tw of the coolant water reaches the threshold value THTw1. Then, the warm-up of the FC 40 is finished (S42: YES), and the FC system 12 transitions to the normal mode.

4. Advantages of the Present Embodiment

As described above, in the above embodiment of the present invention, in the warm-up mode and the second normal mode, since the FC voltage Vfc is fixed to the first minimal value Vlmi1 or the like outside the oxidation reduction region R3, oxidation reaction and reduction reaction of catalyst are prevented from occurring frequently repeatedly in the same period. Thus, degradation of the FC 40 can be prevented. In particular, since the FC voltage Vfc is fixed to the electric potential Vlmi1 within the reduction region R2 where degradation D is relative small (and thereafter, fixed to a value set in step S44 of FIG. 13), it becomes possible to further reduce degradation D. Additionally, in the warm-up mode and the second normal mode, since the air stoichiometric ratio Rs (target oxygen concentration Cotgt) is controlled in accordance with the system load Psys whereby the FC 40 outputs the load required by the system load Psys, it becomes possible to suppress excessive generation of electric power and shortage of generated electric power in the FC 40.

In the embodiment of the present invention, in the case where stability in power generation of the FC 40 is impaired (S41 of FIG. 13: NO), the target FC voltage Vfctgt (FC voltage Vfc) is increased within a range (reduction region R2) below the oxidation reduction region R3 (S44). In the case where stability in power generation of the FC 40 is impaired, by raising the FC voltage Vfc, FC current Ifc can be reduced. Further, since the air stoichiometric ratio Rs is increased, it becomes possible to maintain stability in power generation desirably.

In the embodiment of the present invention, the first minimal value Vlmi is set to the minimum motor drive voltage Vmotmin or less, and the warm-up is performed with the FC voltage Vfc being fixed to the first minimal value Vlmi (or a voltage which stabilizes the FC 40) until normal operation of the FC system 12 (FC 40) is made possible. Then, when the normal operation of the FC system 12 (FC 40) is made possible, the FC voltage Vfc is adjusted to the minimum motor drive voltage Vmotmin, and then the warm-up is performed. Thus, both the rapid warm-up and the operation of the FC system 12 can be achieved.

In the present embodiment, the FC system 12 is mounted on the vehicle 10. Thus, high durability of the vehicle 10, and high start-up performance of the vehicle 10 can be achieved suitably.

5. Modified Embodiment

The present invention is not limited to the above described embodiment. The present invention can adopt various structures based on the description herein. For example, the following structure may be adopted.

[5-1. Application of FC System]

Though the FC system 12 is mounted in the FC vehicle 10 in the above described embodiment, the present invention is not limited in this respect. The FC system 12 may be mounted in other objects. For example, the FC system 12 may be used in movable objects such as ships or air planes. Alternatively, the FC system 12 may be applied to household power systems.

[5-2. Structure of FC System 12]

Figure 24:
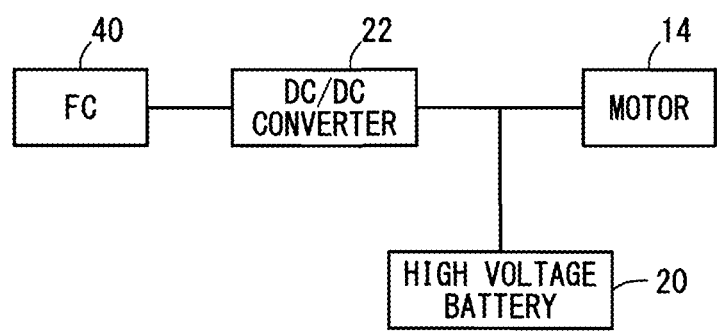
FIG. 24 is a block diagram schematically showing a structure of a first modified example of the fuel cell system according to the embodiment.
Figure 25:
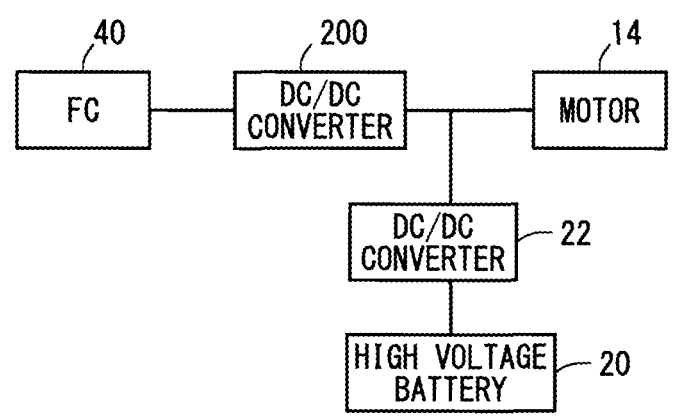
FIG. 25 is a block diagram schematically showing a structure of a second modified example of the fuel cell system according to the embodiment.
Figure 26:
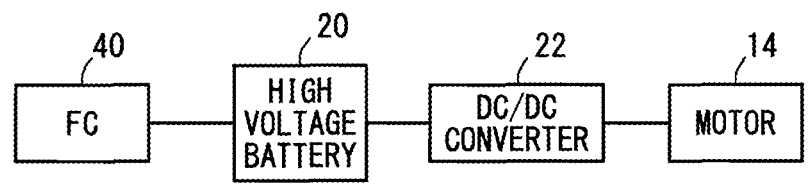
FIG. 26 is a block diagram schematically showing a structure of a third modified example of the fuel cell system according to the embodiment.
Figure 27:
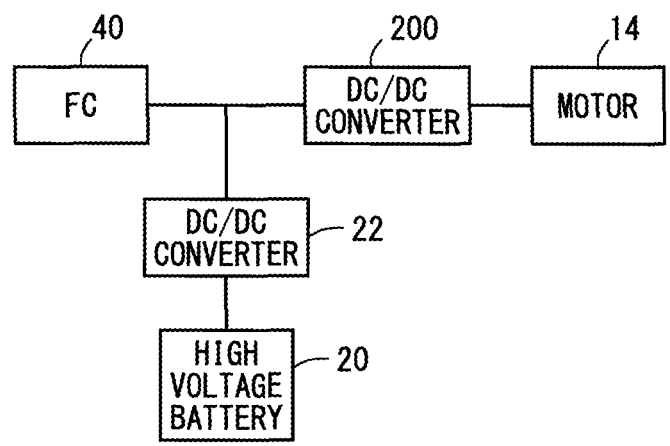
FIG. 27 is a block diagram schematically showing a structure of a fourth modified example of the fuel cell system according to the embodiment.

In the above embodiment, the FC 40 and the high voltage battery 20 are arranged in parallel, and the DC/DC converter 22 is provided on the near side of the battery 20. However, the present invention is not limited in this respect. For example, as shown in FIG. 24, the FC 40 and the battery 20 may be provided in parallel, and a step-up, step-down, or step-up/step-down DC/DC converter 22 may be provided on the near side of the FC 40. Alternatively, as shown in FIG. 25, the FC 40 and the battery 20 may be provided in parallel, and a step-up, step-down, or step-up/step-down DC/DC converter 200 may be provided on the near side of the FC 40 and the DC/DC converter 22 may be provided on the near side of the battery 20. Alternatively, as shown in FIG. 26, the FC 40 and the battery 20 may be provided in series, and the DC/DC converter 22 may be provided between the battery 20 and the motor 14. Alternatively, as shown in FIG. 27, the FC 40 and the battery 20 may be provided in parallel, the DC/DC converter 200 may be provided on the near side of the motor 14, and the DC/DC converter 22 may be provided on the near side of the battery 20. In the structure of FIG. 27, the DC/DC converter 22 on the near side of the battery 20 controls the output of the FC 40, and the DC/DC converter 200 on the near side of the motor 14 controls the input voltage applied to the motor 14. Thus, even in the case where the vehicle 10 travels in the warm-up mode, the target FC voltage Vfctgt can be set to a value less than the minimum motor drive voltage Vmotmin.

[5-3. Stoichiometric Ratio]

In the above described embodiment, a means or a method of adjusting the stoichiometric ratio is performed by adjusting the target oxygen concentration Cotgt. However, the present invention is not limited in this respect. Alternatively, target hydrogen concentration may be adjusted. Further, instead of the target concentration, the target flow rate, or both of the target concentration and the target flow rate may be adjusted.

In the above described embodiment, a structure including the air pump 60 for supplying air containing oxygen is illustrated. Alternatively or additionally, a structure including a hydrogen pump for supplying hydrogen may be adopted.

In the above described embodiment, a structure including a merging channel (pipes 66a, 66b) for merging the cathode off gas with the fresh air, and the circulation valve 66 is illustrated. Alternatively or additionally, the anode side may have the same structure. For example, a circulation valve may be provided in the pipe 48b for controlling the flow rate of the anode off gas merged with fresh hydrogen by the circulation valve.

[5-4. Power Supply Mode]

In the above embodiment, the temperature Tw of the coolant water is used as a criterion for determining whether or not the warm-up mode should be performed. However, the present invention is not in this respect. Any criteria for making it possible to estimate the temperature of the FC 40 can be used. For example, in addition to, or instead of the temperature Tw of the coolant water, at least one of the temperature outside the vehicle 10, the temperature of the fuel gas, and the temperature of the oxygen-containing gas may be used.

The above embodiment of the present invention has been described in connection with the case where the first minimal value Vlmi1 is lower than the minimum motor drive voltage Vmotmin (see FIG. 9). However, the present invention is not limited in this respect. The present invention is also applicable to a case where the minimum motor drive voltage Vmotmin is lower than the first minimal value Vlmi. In this case, for example, in the warm-up mode, regardless of whether or not traveling of the vehicle 10 is allowed, firstly, the first minimal value Vlmi1 is set as the target FC voltage Vfctgt, and the target FC voltage Vfctgt is increased until stability of the FC 40 can be obtained.

In the above embodiment, the initial target FC voltage Vfctg at the time of warming up operation is set to the first minimal value Vlmi1. Alternatively, any value in the neighboring region (e.g., 0.6 to 0.7 V) may be set as the initial target FC voltage Vfctg.

In the above embodiment, in the case where the temperature Tw of the coolant water in the warm-up mode is less than the threshold value THTw2, the initial target FC voltage Vfctgt is set to the first minimal value Vlmi1×cell number. However, the present invention is not limited in this respect. For example, the initial target FC voltage Vfctgt may be set to any other electric potential near the first minimal value Vlmi1 within the reduction region R2×cell number.

[5-5. Other]

In the above embodiment, the process of the warm-up mode is used during warm-up operation of the FC 40. Alternatively, the process of the warm-up mode may be used during the normal operation. That is, during normal traveling, the target FC voltage Vfctgt may be fixed to the first minimal value Vlmi1 (or a higher voltage which stabilizes the power generation of the FC 40), and the air stoichiometric ratio Rs (target oxygen concentration Cotgt) may be adjusted depending on the system load Psys.

While the invention has been particularly shown and described with reference to preferred embodiments, it will be understood that variations and modifications can be effected thereto by those skilled in the art without departing from the spirit of the invention as defined by the appended claims.

What is claimed is:

1. A method of controlling a fuel cell system of a vehicle, comprising:

a fuel cell having catalyst, for performing power generation by inducing reaction of oxygen or hydrogen at the catalyst; a gas supply unit configured to supply at least one of the oxygen and the hydrogen to the fuel cell; a voltage controller configured to control power generation voltage of the fuel cell; a load driven by electric power outputted from the fuel cell; and a gas supply controller configured to control the voltage controller to fix an actual voltage of the fuel cell to a predetermined voltage outside a voltage range where an oxidation-reduction of the catalyst proceeds, and, in a state where the actual voltage is thus fixed, the gas supply controller is configured to control the gas supply unit such that concentration of at least one of the oxygen and the hydrogen is adjusted in accordance with electric power required by the load, the method comprising: by use of the gas supply controller, supplying electric power to a motor by the fuel cell system;

performing a first warm-up operation of the fuel cell if it is determined that a temperature of the fuel cell is a first predetermined temperature or less, and fixing, during the first warm-up operation, via the gas supply controller, the voltage of the fuel cell to a voltage value within a voltage region where degradation is relatively small, the voltage region being below the voltage range where the oxidation-reduction proceeds, and changing, via the gas supply controller, an amount of gas supplied to the fuel cell in accordance with the electric power required by the load, during the first warm-up operation, in a case where the predetermined voltage is equal to or less than a minimum motor drive voltage required for said vehicle to drive; and as long as a temperature of the fuel cell is a second predetermined temperature or less, performing a second warm-up operation with the power generation voltage fixed to the predetermined voltage;

performing a normal operation of the fuel cell when it is determined that the temperature of the fuel cell is higher than the second predetermined temperature, and performing the first warm-up operation with the power generation voltage adjusted to a value which is the minimum motor drive voltage or more and below the voltage range where the oxidation-reduction of the catalyst proceeds, wherein the vehicle is able to travel during the normal operation, the second predetermined temperature is lower than the first predetermined temperature, and wherein the vehicle is permitted to travel during the first warm-up operation and the vehicle is not permitted to travel during the second warm-up operation.

2. The method of controlling the fuel cell system of the vehicle according to claim 1, further comprising: in a case where stability in power generation of the fuel cell is impaired, increasing the voltage of the fuel cell within a voltage range below the voltage range where the oxidation-reduction proceeds.

3. The method of controlling the fuel cell system of the vehicle according to claim 1, wherein the fuel cell system is mounted in a vehicle.

* * * * *